United States Patent [19]
Chang et al.

[11] Patent Number: 5,870,753
[45] Date of Patent: Feb. 9, 1999

[54] METHOD AND APPARATUS FOR ENABLING A PERSISTENT METASTATE FOR OBJECTS IN AN OBJECT ORIENTED ENVIRONMENT

[75] Inventors: David Yu Chang, Austin; Robert Howard High, Jr.; Russell Ley Newcombe, both of Round Rock; Ashvin Radiya, Austin, all of Tex.

[73] Assignee: International Business Machines Corporation, Armonk, N.Y.

[21] Appl. No.: 619,041

[22] Filed: Mar. 20, 1996

[51] Int. Cl.$^6$ .................................................. G06F 17/30
[52] U.S. Cl. ......................... 707/103; 707/10; 707/102; 707/2; 395/200.31; 395/200.47; 711/172
[58] Field of Search .................................. 395/610, 614, 395/602, 200.31, 200.47; 707/103, 10, 102, 2; 711/172

[56] References Cited

U.S. PATENT DOCUMENTS

| | | | |
|---|---|---|---|
| 4,853,842 | 8/1989 | Thatte et al. .............................. | 364/200 |
| 5,247,669 | 9/1993 | Abraham et al. ........................ | 395/600 |
| 5,291,593 | 3/1994 | Abraham et al. ........................ | 395/600 |
| 5,295,256 | 3/1994 | Bapat ....................................... | 395/500 |
| 5,437,027 | 7/1995 | Bannon et al. .......................... | 395/600 |
| 5,613,099 | 3/1997 | Erickson et al. ......................... | 707/103 |
| 5,613,124 | 3/1997 | Atkinson et al. ........................ | 345/433 |
| 5,640,546 | 6/1997 | Bhaskarpillai et al. ................ | 395/551 |
| 5,664,182 | 9/1997 | Nierenberg et al. .................... | 707/102 |

*Primary Examiner*—Thomas G. Black
*Assistant Examiner*—Jean R. Homere
*Attorney, Agent, or Firm*—David A. Mims, Jr.

[57] ABSTRACT

A method and apparatus for enabling the maintenance of multiple metastates for a persistent object without increasing the size of the object reference. An object reference data structure is provided in memory and persistent storage to carry a key which contains a universal unique identification (UUID) of an object and other generic common information of the object. A table, maintained by a server process in memory and persistent storage, contains tuples consisting of a key and metastates for persistent objects. A technique is also provided for interacting with the object for the exchange of metastate and the handling of lifecycle issues such as object creation, passivation (removing from memory), reactivation (restoring to memory) and destruction. Additional types of metastates may be added without reimplementation of the server which manages the persistent objects.

18 Claims, 20 Drawing Sheets

METHOD AND APPARATUS FOR ENABLING A PERSISTENT METASTATE FOR OBJECTS IN AN OBJECT ORIENTED ENVIRONMENT

FIELD OF THE INVENTION

The present invention relates to data processing systems, and more particularly, to a distributed object-oriented system for enabling object references to be used to specify an unlimited number of metastates or critical data needed to restore persistent objects.

RELATED APPLICATION

This application is related to Ser. No. 08/619,049, entitled Method and Apparatus for Enabling A Persistent Attributes in an Object Oriented Environment, which is incorporated herein by reference.

BACKGROUND OF THE INVENTION

Object oriented programming has long been advanced as a solution for liberating programmers from the shackles of particular languages, tools, operating systems, address spaces, networks compilers or applications. Component standards are evolving for creating component infrastructures in object-oriented programming languages which will allow a component, consisting of selected distributed objects, to exist on any network and communicate with other components, whether it be across desk tops or whole enterprises. One of the leading standards is the Common Object Request Broker Architecture (CORBA). In the CORBA specification of the Object Management Group (OMG), a client is given the ability to access an object through an object reference to that object. The object reference is the information needed to specify an object to an Object Request Broker (ORB). Object references not only allow objects to be identified in a request from a client to an ORB, but also can be used to carry metastate for persistent objects. The metastate for a persistent object is the critical data needed to restore the persistent object when it does not exist in the memory of the ORB's process.

Objects may be composed by multiply inheriting the implementations of several different interfaces (an implementation of an interface is commonly called a class). Each of these classes may be implemented using different forms of persistence. Some may use the CORBAservices Persistent Object Service interfaces in their implementation. Others may use their own unique form of persistence and still others may actually be implemented as wrappers of non-object oriented legacy data (such as data previously stored in relational databases). Each of these approaches to persistence require implementations to maintain different types of metastate in order to restore a persistent object. When a single object inherits from several of theses classes, a single object reference is required to carry these various forms of metastate in order to support each of the inherited classes.

When an object inherits from multiple classes (whether they be implementations of CORBAservices such as Naming, Events, Security, Persistence, Externalization, Transactions, and Concurrency, or be they application interface implementations), maintaining the multiple metastates can be problematic. The CORBA specification requires that the reference data carried in an object reference cannot exceed an octet sequence of 1024 (this is where the metastate must be stored). When multiple different metastates are carried, this can easily be exceeded.

Besides the problem of storing multiple metastates in the object reference, another problem is how to restore the metastate of each of the object's inherited classes when the object is restored, thus allowing each of the inherited classes to restore its portion of the persistent object.

It is therefore desirable to have a method and apparatus for enabling an object reference to maintain metastate data persistently, without increasing the size of the object's reference, and for retrieving and restoring the metastate for each inherited class of a persistent object when the persistent object is being removed and restored in memory.

SUMMARY OF THE INVENTION

This invention relates to a method and apparatus for enabling the maintenance of multiple metastates for a persistent object without increasing the size of the object reference. An object reference data structure is provided to carry a key which contains a universal unique identification (UUID) of an object and other generic common information of the object. A reference-data-table, maintained by a server process in memory and persistent storage, will contain tuples consisting of a key and metastates for persistent objects. A procedure is provided for registering an object with the server as a persistent object. Upon registration with a server process, a key is created for the object and an entry is made in the in memory and persistent reference-data-tables. In addition, provisions are made for storing and retrieving the metastates of the persistent object from the classes inherited by the object. Finally, the invention provides a technique for restoring a persistent object when the object doesn't exist in memory (a persistent object may be removed from memory when its server is going down or it is flushed from memory because its server runs out of cache memory). The collaboration between the server and the persistent objects is achieved through the introduction of a server class and persistent object base class.

DETAILED DESCRIPTION OF THE EMBODIMENTS

Figure 1:
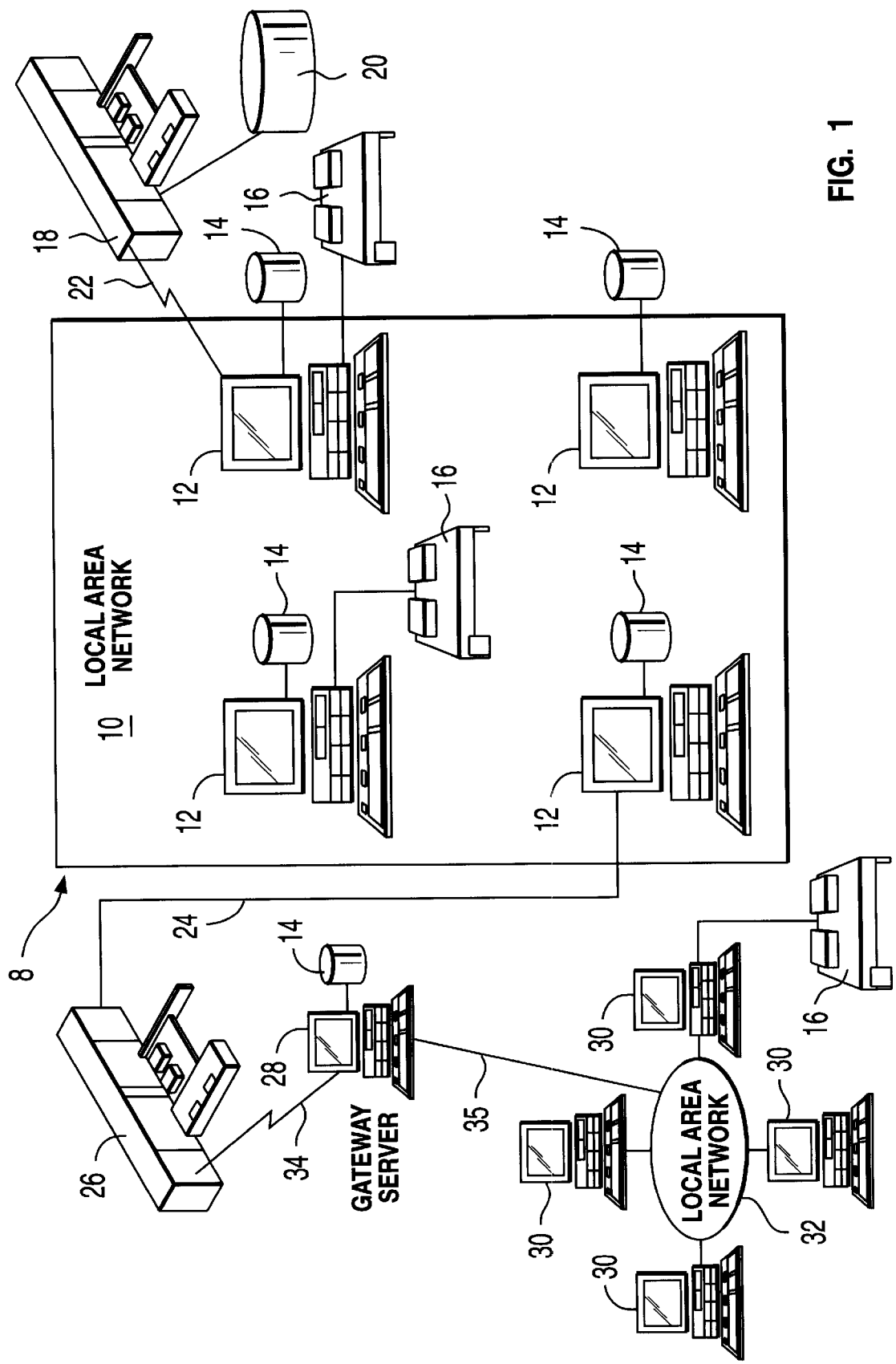
FIG. 1 is a block diagram representation of a distributed object-oriented data processing system where the invention may be practiced.

This invention provides a method and apparatus for allowing multiple forms of persistence to be used by an object, through the enabling of persistent metastates associated with an object reference in a distributed object environment. The metastate of an object is maintained persistently without increasing the size of the object reference. For the purpose of this invention, the metastate of an object refers to critical data needed to restore a persistent object when it does not exist in memory. A representative hardware environment where this invention may be practiced is depicted in FIG. 1, which illustrates a pictorial representation of a distributed data processing system 8. As illustrated, data processing system 8 contains a plurality of networks, including local area networks (LAN) 10 and 32, each of which preferably includes a plurality of individual computers 12 and 30, respectively. One skilled in the art will appreciate that a plurality of workstations coupled to a host processor may be utilized for each such network. As is common in such data processing systems, each computer 12 and 30, may be coupled to a storage device 14, and a printer 16.

Data processing system 8 further includes one or more mainframe computers, such as mainframe computer 18, which may be preferably coupled to LAN 10 by means of a communication link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, data processing system 8 additionally includes unillustrated gateways, routers, bridges, and various other network hardware utilized to interconnect the segments of data processing system 8.

Figure 2:
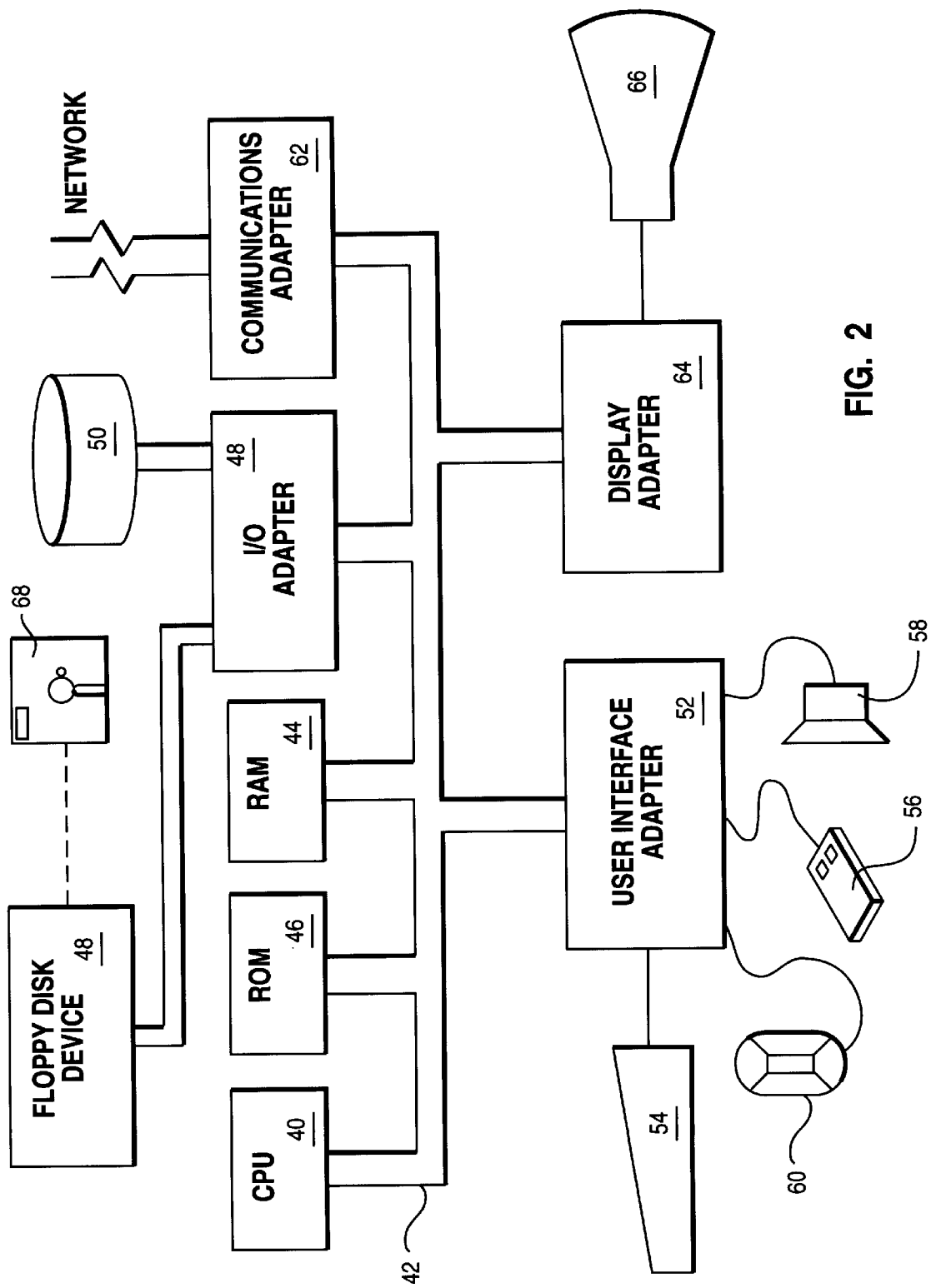
FIG. 2 is a block diagram representation of a computer/workstation where the invention may be practiced.

Referring now to FIG. 2, there is shown a pictorial representation of a workstation, having a central processing unit 40, such as a conventional microprocessor, and a number of other units interconnected via a system bus 42. The workstation shown in FIG. 2, includes a Random Access Memory (RAM) 44, Read Only Memory (ROM) 46, an I/O adapter 48 for connecting peripheral devices such as disk unit 50 to the bus, a user interface adapter 52 for connecting a keyboard 54, a mouse 56, a speaker 58, a microphone 60, and/or other user interface devices such as a touch screen device (not shown) to the bus, a communication adapter 62, for connecting the workstation to a data processing network and a display adapter 64, for connecting the bus to a display device 66. The workstation, in the preferred embodiment, has resident thereon the OS/2 operating system and the computer software making up this invention which is included as a toolkit. One skilled in the art will appreciate that the procedures of this invention may be in the form of a computer program product on a computer readable medium, which may be temporarily or permanently loaded on the workstation in disk storage 50, floppy diskette 68, or main memory 44.

Figure 3:
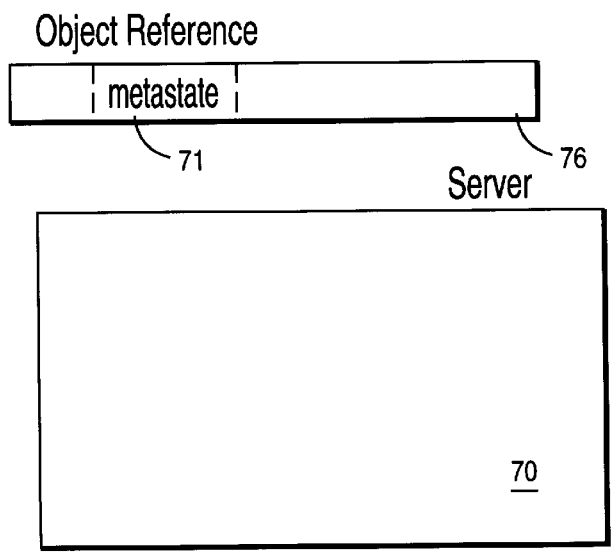
FIG. 3 is a block diagram of a prior art use of metastate data for storing a persistent object persistently on permanent storage.
Figure 3:
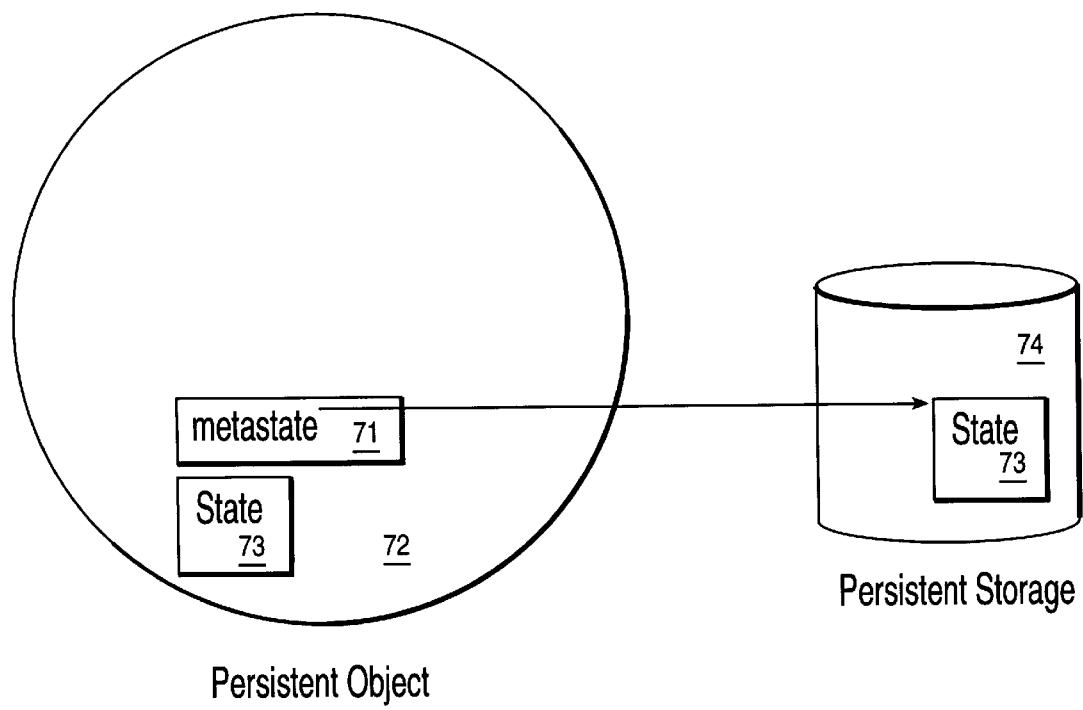

Turning now to FIG. 3, there is shown a prior art representation for enabling object persistence for a single persistence mechanism. A server 70, is illustrated which understands a persistence mechanism being used, and how to interact with a persistent object within its context in a manner well known in the art. The server 70, interacts with the object in memory 72, which contains the metastate 71, and object state 73, for the persistent object. The object state 73, for the persistent object is permanently stored on some type of persistent storage 74 (e.g., hard disk, file, tape, etc). The server 70, creates an object reference 76, for the persistent object and interprets the object reference 76, to access and/or restore the persistent object in memory 72. One skilled in the art appreciates that the object reference 76, contains the metastate 71, which is needed for the object state 73, to be restored in memory 72.

Figure 4:
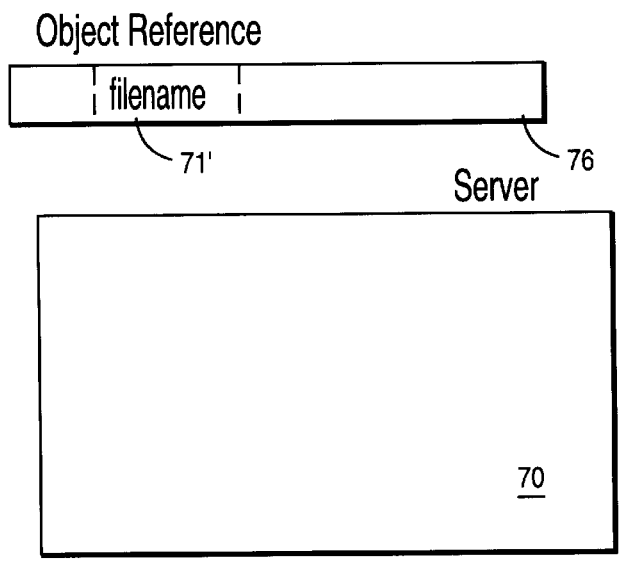
FIG. 4 is a block diagram of a prior art use of metastate data for storing a persistent object on a file.
Figure 4:
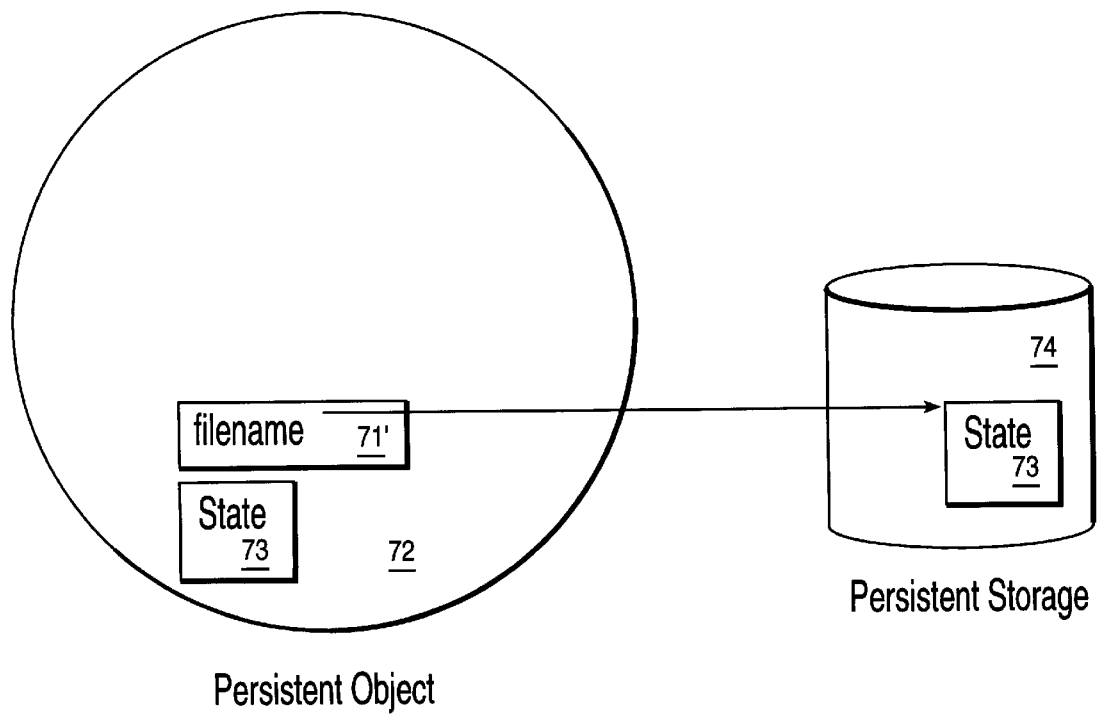

Turning now to FIG. 4, an example is shown for storing a persistent object on a file using a prior art technique. Server 70, interacts with the object in memory 72, which uses the persistence mechanism to store the object state 73, in persistent storage 74, which is a file in this example. The metastate needed is the filename 71', which is used to permanently store the object state 73, on persistent storage 74.

Figure 5:
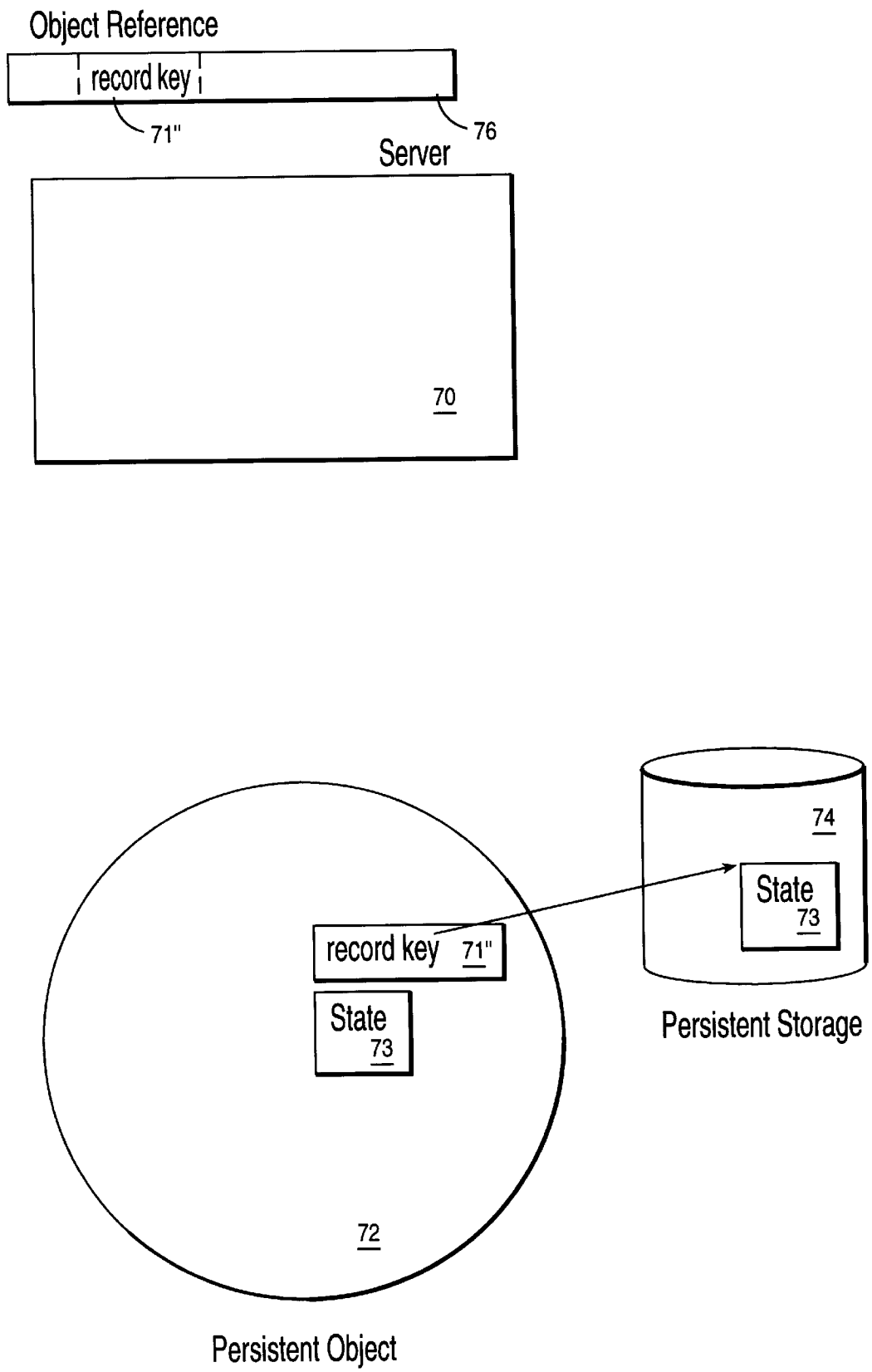
FIG. 5 is a block diagram of a prior art technique for storing a persistent object in a row of a relational database.

Referring now to FIG. 5, a second example is shown for a persistence mechanism in the prior art. As depicted in FIG. 5, a server 70, is associated with a particular relational database table. Each object associated with server 70, has its object state 73, stored as a row in the table. The metastate needed to access and/or restore the persistent object on persistent storage 74, is the record_key 71", for the row containing the state.

Two classes may now be defined, one using the persistence mechanism utilizing the metastate filename illustrated in FIG. 4, and another using the metastate record_key illustrated in FIG. 5. If a third class is created that multiply inherits from the two defined classes, the object reference of the third class is required to specify the metastate of both classes.

Figure 6:
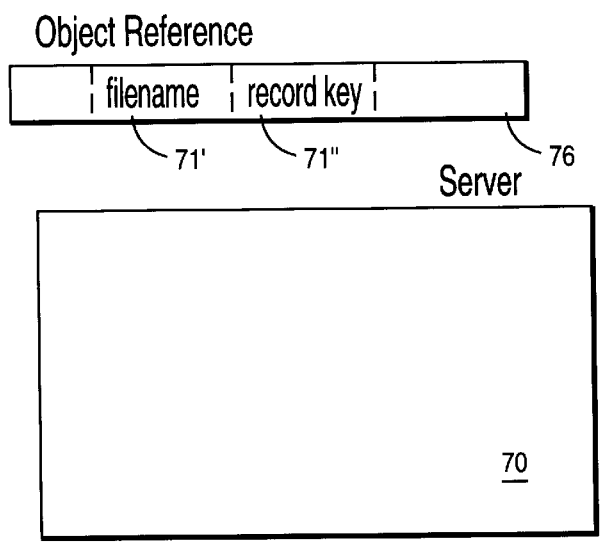
FIG. 6 is a block diagram of a prior art procedure for storing a persistent object that multiply inherits from different persistent storage mechanisms.
Figure 6:
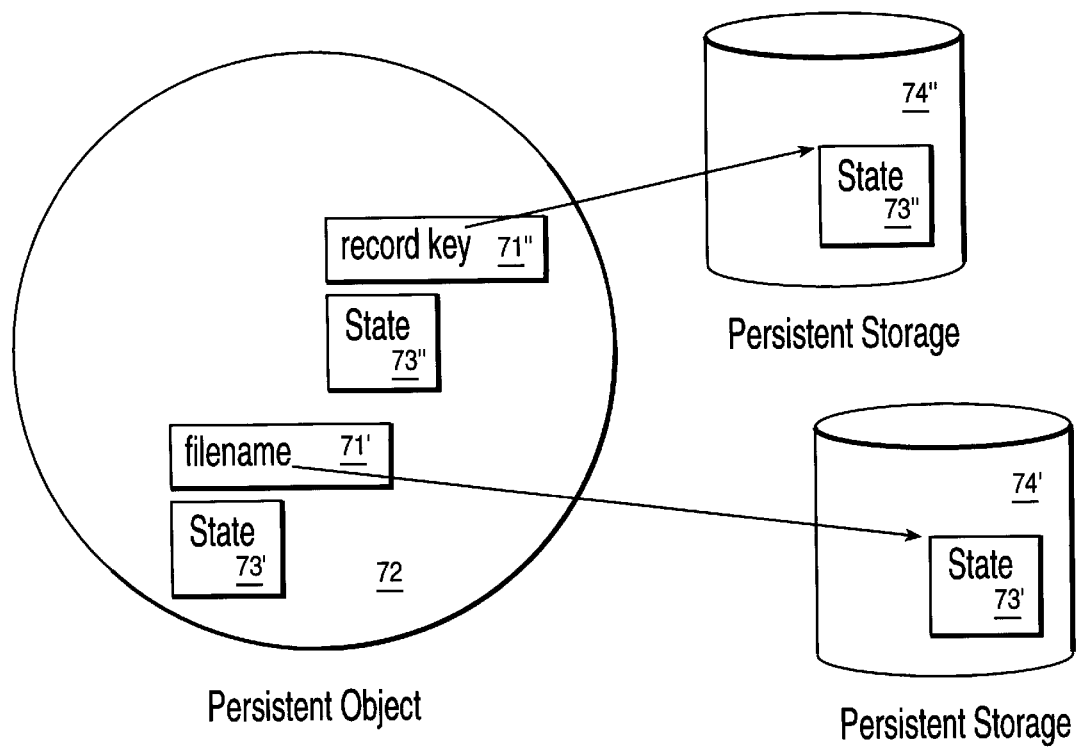

Turning now to FIG. 6, there is depicted an example for handling a persistent object which inherits from multiple classes with different forms of persistence in the prior art. The object reference 76, is required to specify the metastate of both persistence mechanisms. The object in memory 72, contains the metastate filename 71', and the associated object state 73', from the first inherited class and the metastate record key 71", and associated object state 73", from the second inherited class. One skilled in the art will appreciate that each combination of different forms of persistence requires the implementation of a unique server 70, and each form of persistence requires the addition of metastate data to the object reference 76.

Figure 7:
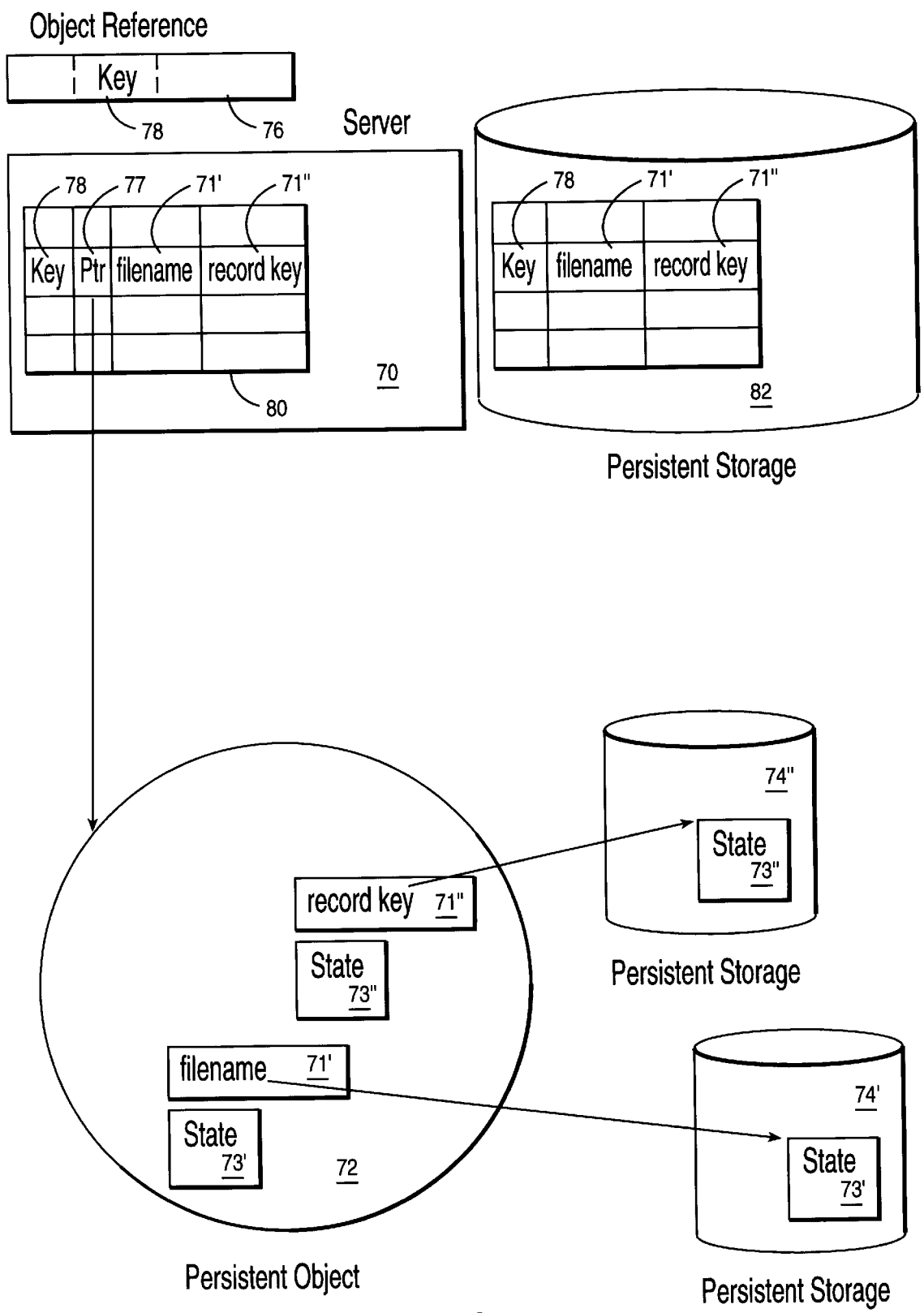
FIGS. 7 and 8 are block diagrams describing the use of a key in the object reference as used in this invention.

Turning now to FIG. 7, the invention is shown for enabling a persistent metastate for multiple forms of persistence. The invention provides a single server implementation and an object reference which does not grow in size for each new form of persistence. The single server implementation provides the benefit of reuse, while the new object reference eliminates the problem caused by the fixed-sized object reference defined by CORBA. Even if CORBA had not fixed the size of the object reference, it would still be desirable to make the object reference as small as possible because the object references are typically duplicated many times and also are frequently passed through the network. Performance is affected due to the need to transmit large object references. Returning to FIG. 7, an object reference 76, is shown which does not specify the metastate data (e.g., filename, record key) for the object, but instead specifies a key 78, that has been generated by the server 70. Server 70, maintains its own in memory 80, containing for each object the key 78, a pointer 77, to the storage location for the persistent object in memory 72, the metastate filename 71', and the metastate record key 71". In addition, server 70 has access to persistent storage 82, to keep the metastate data persistently. Persistent storage 82, has stored therein for each object the key 78, as well as metastate data, filename 71' and record key 71". Server 70, accesses the metastate data contained in memory 78, and persistent storage 82, using the key 78, from the object reference 76. One skilled in the art will appreciate that the persistent object in memory 72, and its persistent mechanisms 74' and 74" (e.g., file, database row) are the same as previously described in the prior art.

Figure 8:
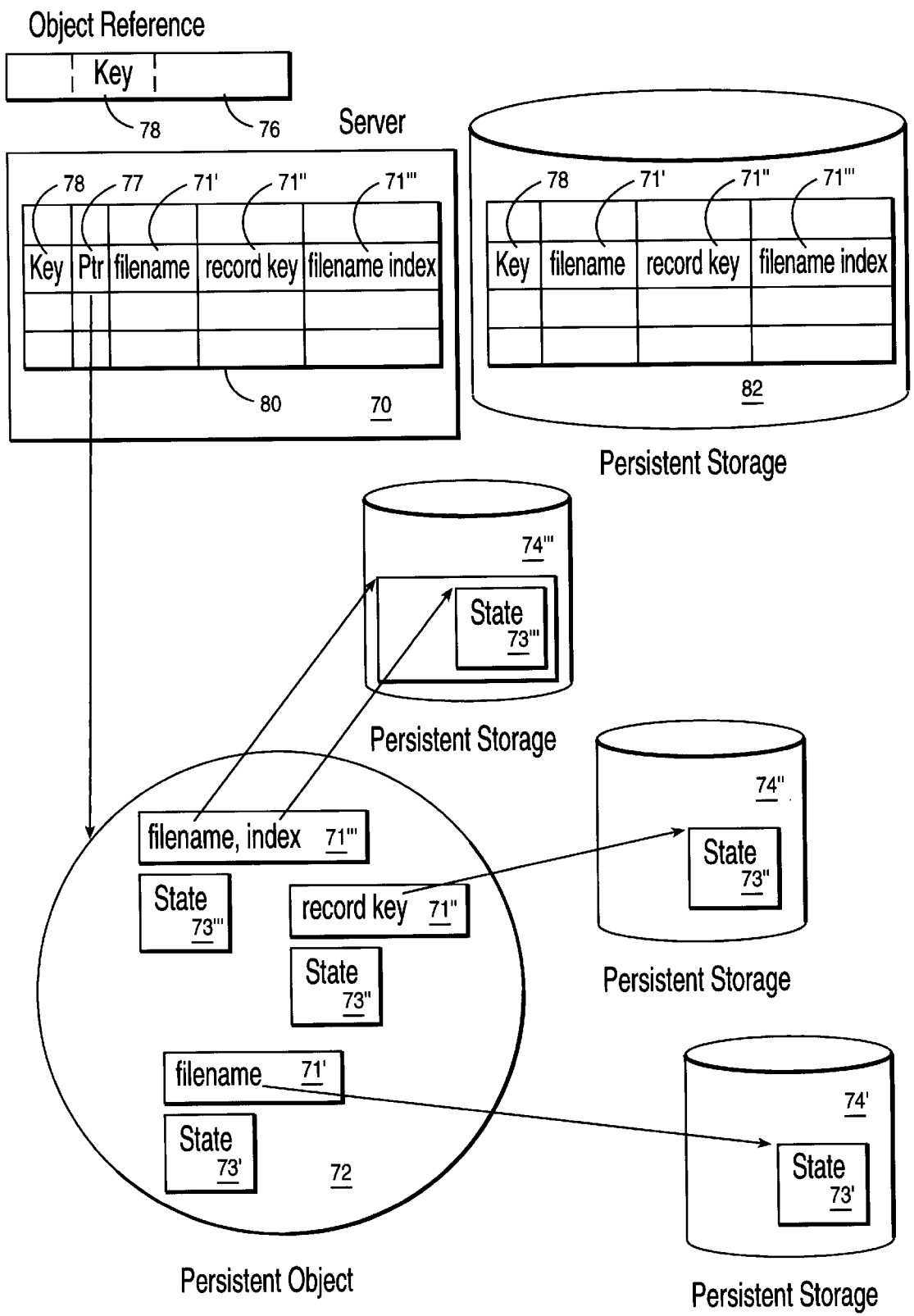

Turning now to FIG. 8, an example of the invention is shown where a third persistence mechanism has been added without increasing the size of the object reference. The persistence mechanism is an indexed file, where the object in memory 72, contains the metastate composed of the filename 71''', along with the associated state 73'''. The metastate identifies the filename and an index into the file where the object's state is located on persistent storage 74'''. As is apparent to one skilled in the art, the metastate has been added for the persistent object in memory 72, server memory 80, and server persistent database 82, without increasing the size of the object reference 76.

Figure 9:
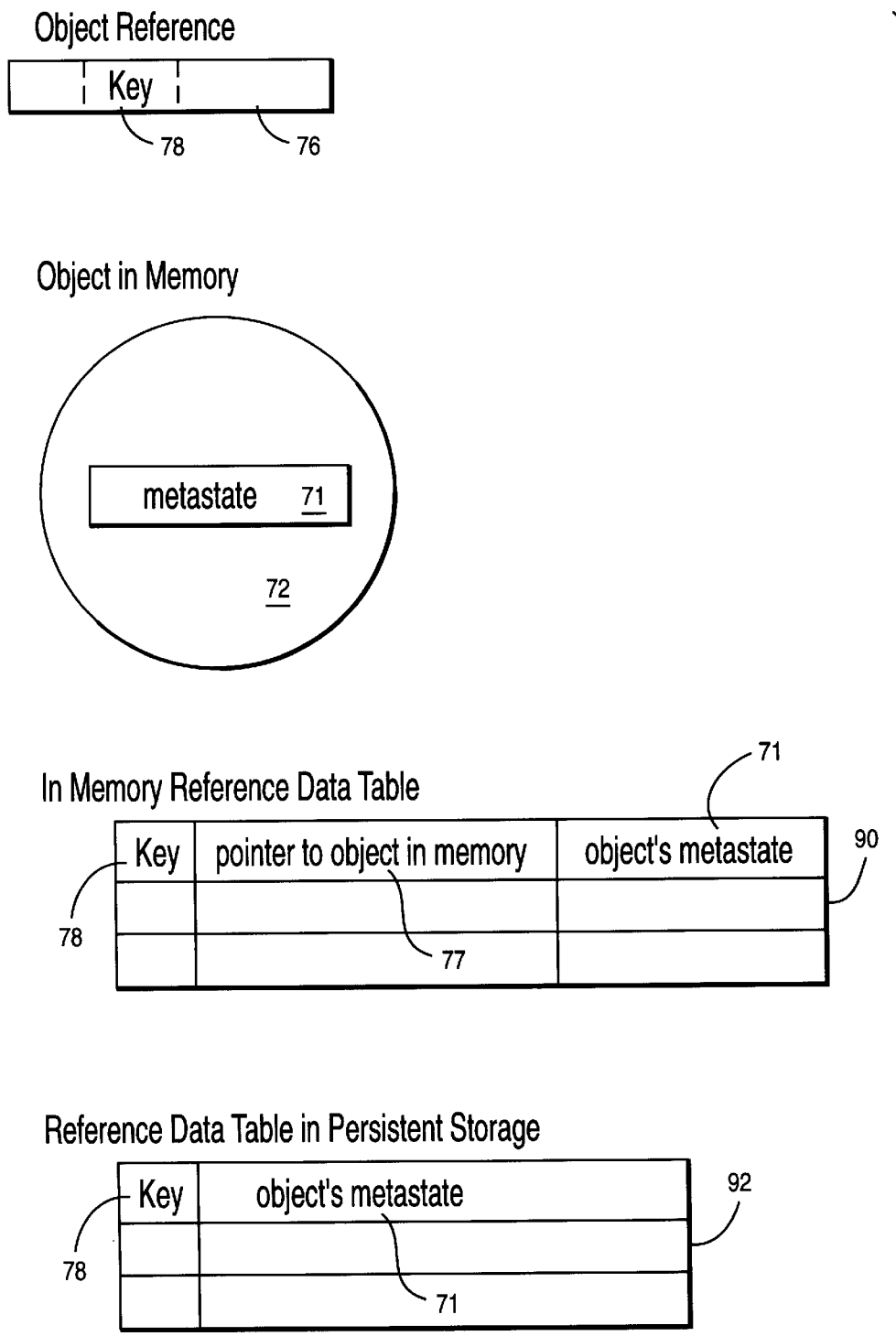
FIG. 9 is a block diagram of the memory structures to implement this invention.

Turning now to FIG. 9, the preferred embodiment of the structure for maintaining metastate data persistently, without increasing the size of the object reference is depicted. A server process maintains a reference data table in memory 90, along with a reference data table in persistent storage 92, such as a file or a relational database. The reference data table in memory 90, contains for each persistent object managed by the server, a key 78, a pointer 77 to the memory location 72, containing the object, and the metastate 71 for the object. The reference data table in persistent storage 92, contains the key 78, and the metastate 71, for each persistent object. Each persistent object in memory 72, contains the metastate 71, required to save/restore the objects, state persistently, using whatever mechanism the object deems appropriate. Object reference 76, contains the key 78, which is used by the server process to associate the object reference with a row in the reference data table in both persistent storage 92 and in memory 90. When the server is called upon to associate an object reference 76, with an object in memory 72, the server uses the key 78, to find the row for that object in the reference data table in memory 90. If the pointer to the in-memory object 77 is null, the object is restored. Restoration consists of creating a new object in memory 72, providing it with its metastate 71, and allowing it to initialize itself based on its persistent state.

The key 78, used to identify objects, is generated by the server when it is requested to make a particular object persistent. TABLE A shows an example of a preferred embodiment for the key structure. The example provides a structure in pseudo code which allows a great deal of flexibility in what the key contains. One skilled in the art appreciates that any key structure can be used provided that where the key is generated by the server, it can be used by that server to uniquely identify the object associated with the key.

TABLE A

```
Structure key_structure {
    unsigned long maximum;
    unsigned long length;
    struct element_structure {
        unsigned long offset;       /*Offset to the next element
                                      in bytes from the beginning
                                      of the first element
                                      structure. */
        TCKind element_id_type;
        unsigned short version_major;
        unsigned short version_minor;
        unsigned long length;
        <element_id_type>  element_id [<element.length>];
    } element [<key.length>];
    string class_name;
} key;
/* Notice that <element.length> and <element_id_type> make
   the element_structure variable length. Likewise,
   <key.length> make the overall key variable length. You
   should use the key.element [n]. offset+&key.element [0]
   to determine the position of the next element structure
   overlay in memory. */
An example of a server key using the above structure looks
like:
key.maximum=2;
key.length=2;
key.element [0] .offset=0+sizeof (long) +sizeof (Typecode) +
    sizeof (short) *2+sizeof (long) +key.element [0] .length;
key.element [0] .element_id_type=tk_string;
key.element [0] .version_major=3;
key.element [0] .version_minor=0;
key.element [0] .length=9;
key.element [0] .element_id="myServer"
key.element [1] .offset=key.element [0] .offset+sizeof (long) +
    sizeof (Typecode) +sizeof (short) *2+sizeof (long) +key.element
    [1] .length;
key.element [1] .element_id_type=tk_octet;
key.element [1] .version_major=3;
key.element [1] .version_minor=0;
key.element [1] .length=16;
key.element [1] .element_id=<UUID>;
key.class_name=<class name>;
```

As previously described, the invention allows the server to maintain multiple metastates for a persistent object without increasing the size of the object reference. In addition, a server which supports persistent objects must provide mechanisms to register objects as persistent, create proper object references for persistent objects, and manage the persistent objects. In order to manage persistent objects, the server object and persistent objects must collaborate. This collaboration is achieved by providing standard interfaces for the server and persistent objects.

TABLE B provides an example server class that contains the methods to achieve the basic collaboration between the server object and persistent objects. These methods can be divided into three categories:

(1) methods make_persistent (),
delete_persistence (), and is_persistent () to register
an object as a persistent object, delete the
persistent aspect of an object, and query whether the
object is persistent.
(2) methods such as store_individual_metastate (),
store_entire_metastate (), and restore_metastate ()
to store and restore metastates of persistent
objects.
(3) methods such as passivate_object () and
passivate_all_objects () to remove in-memory
objects without losing the persistence of
objects The interface definition language (IDL) for the example server defined in the invention is shown in TABLE B.

TABLE B

```
Interface Server : BaseServer {
    Object make_persistent (in Object referenced_object);
        /* The input referenced_object is made persistent
        and a new reference for this persistent object is
        returned */
    void delete_persistence (in Object referenced_object);
        /* The persistence of the referenced_object is
        removed. */
    boolean is_persistent (in Object referenced_object);
        /* Query whether the referenced_object is
        persistent. */
    void store_individual_metastate
        (in Object referenced_object,
        in class_id_e class_id,
        in any individual_metadata);
        /* Store an individual component of the metastate
        individual_metadata corresponding to class_id for
        the referenced_object. */
    void store_entire_metastate (in Object referenced_object);
        /* Store the entire metastate for the
        referenced_object object. */
    void restore_metastate (in Object referenced_object);
        /* Restore the object using the metastate on the
        persistent store. */
    void passivate_object (in Object referenced_object);
        /* Remove the in-memory image of the persistent
        object. */
    void passivate_all_objects ();
        /* Remove in-memory images of all persistent
        objects */
};
```

As shown in TABLE B, the Server inherits from the BaseServer interface. The BaseServer interface defines methods, among many others, for importing and exporting object references which must be overridden in the Server interface to construct proper object references for persistent objects. An example of the BaseServer is in the Basic Object Adapter in CORBA specification, if implemented as a server.

Figure 10:
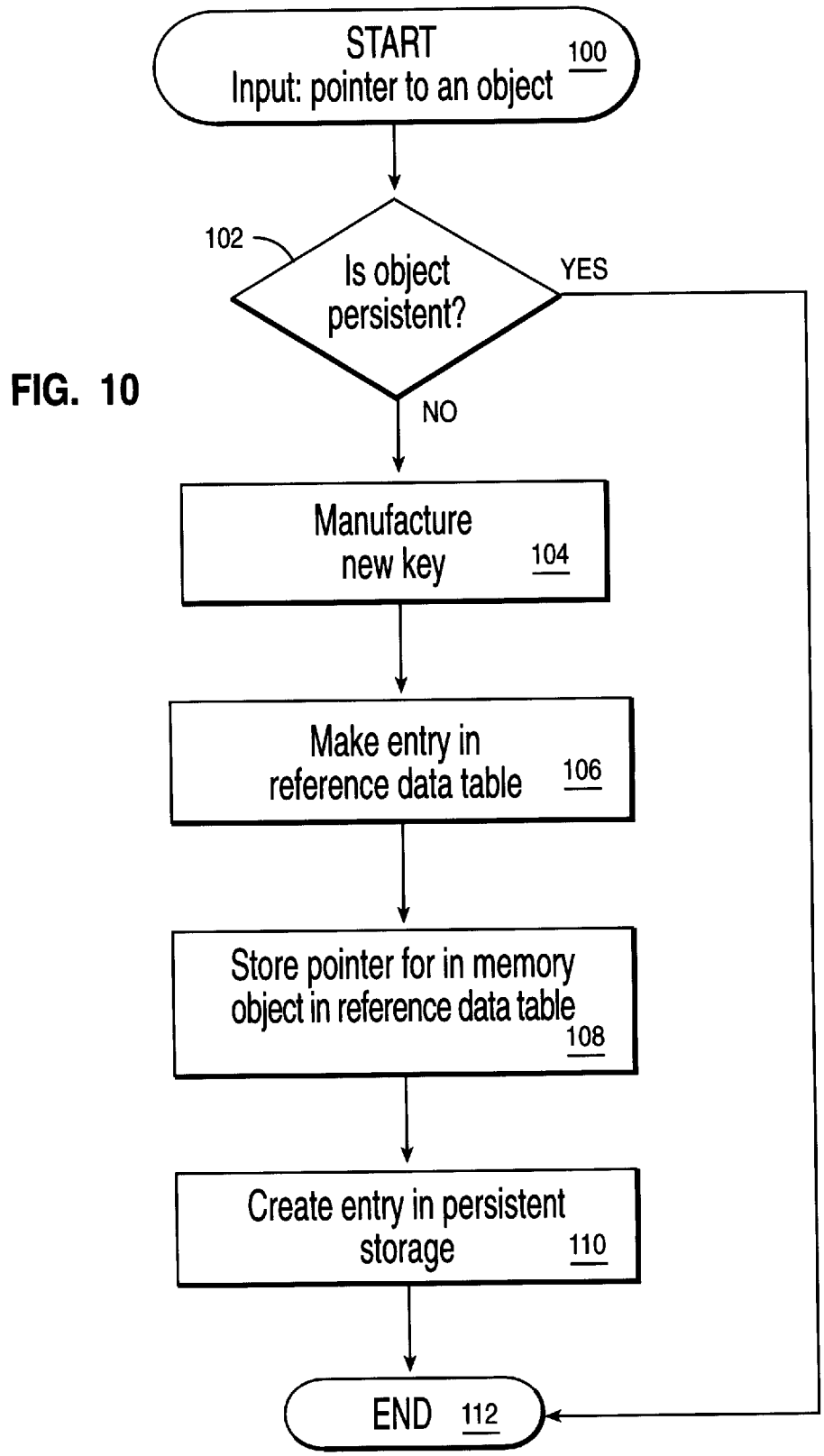
FIG. 10 is a flow diagram for object registration using this invention.

Turning now to FIG. 10, a flow chart for the make_persistent_ref( ) method for registering an object with a server object is shown. An object must be specifically registered with the server to become a persistent object. Prior to registering an object with the server, the object is merely a transient object, which is lost forever if certain operations occur, such as the normal or abnormal termination of the server process. Returning to FIG. 10, the procedure starts at block 100, with an in-memory object as its input, and proceeds immediately to block 102, where it is determined whether the object is persistent. The object is persistent if an entry for it exists in the reference-data-table of the server. If YES, at block 102, the procedure immediately ends. If NO, at block 102, the procedure manufactures a key at block 104, and utilizes the key to make a new entry in the reference data table using the key as shown in block 106. At block 108, the pointer to the in-memory object is put into the transient portion of the reference data table. An entry is then created in persistent storage for the persistent reference as shown in block 110, and the procedure ends at block 112. One skilled in the art will appreciate that no metastate data is actually obtained from the object during the registration process, because that data is obtained only when the object is stored or passivated.

Figure 11:
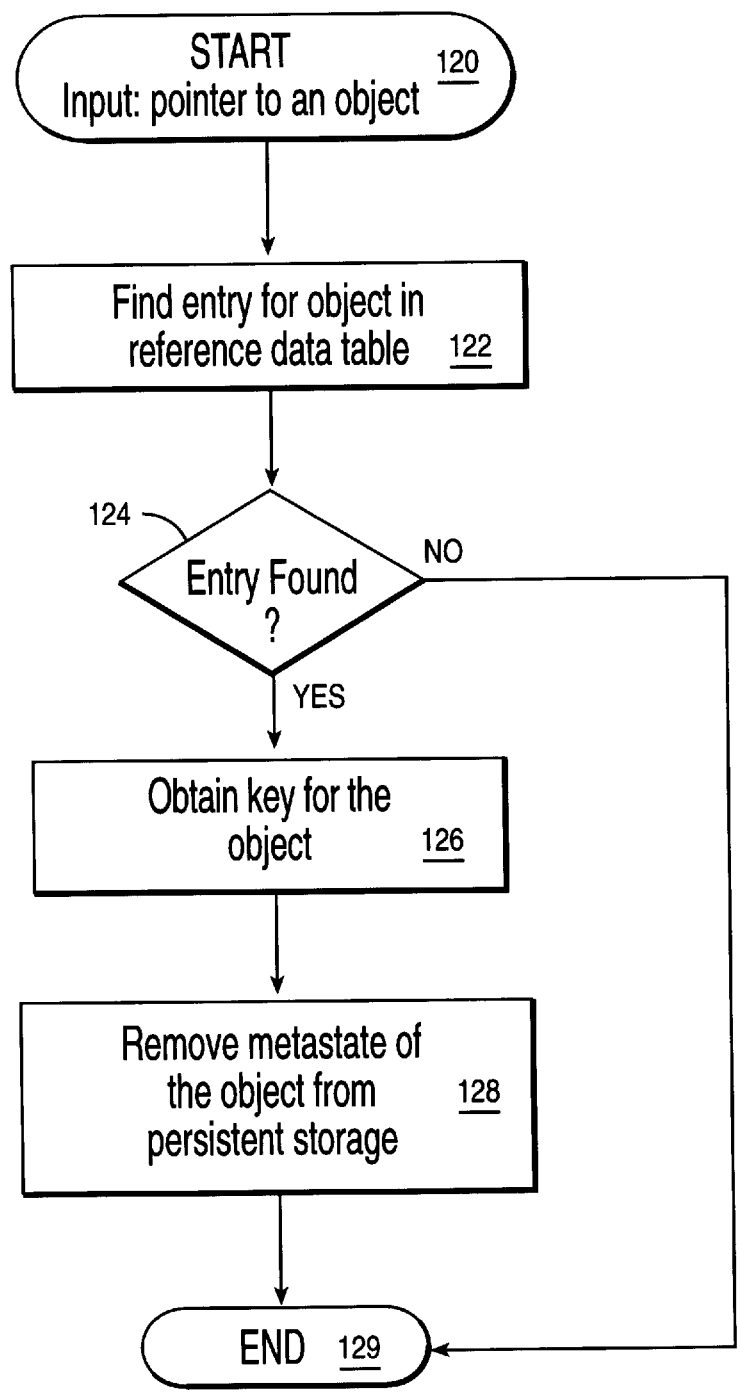
FIG. 11 is a flow diagram for deleting the persistent aspect of an object using this invention.

Turning now to FIG. 11, a procedure is shown for the delete_persistence( ) method in the Server, which removes the persistent aspect of a persistent object. The procedure starts at block 120, using the pointer to an object as its input. At block 122, the procedure finds an entry for the object in the reference data table using the pointer. At block 124, a check is done to determine if an entry is found. If NO, the procedure ends at block 129. If YES, at block 126, a key is obtained for the input object from the entry in the reference data table that was found at block 122. At block 128, the procedure removes the metastate of the object from the persistent storage using the key, and ends at block 129.

Figure 12:
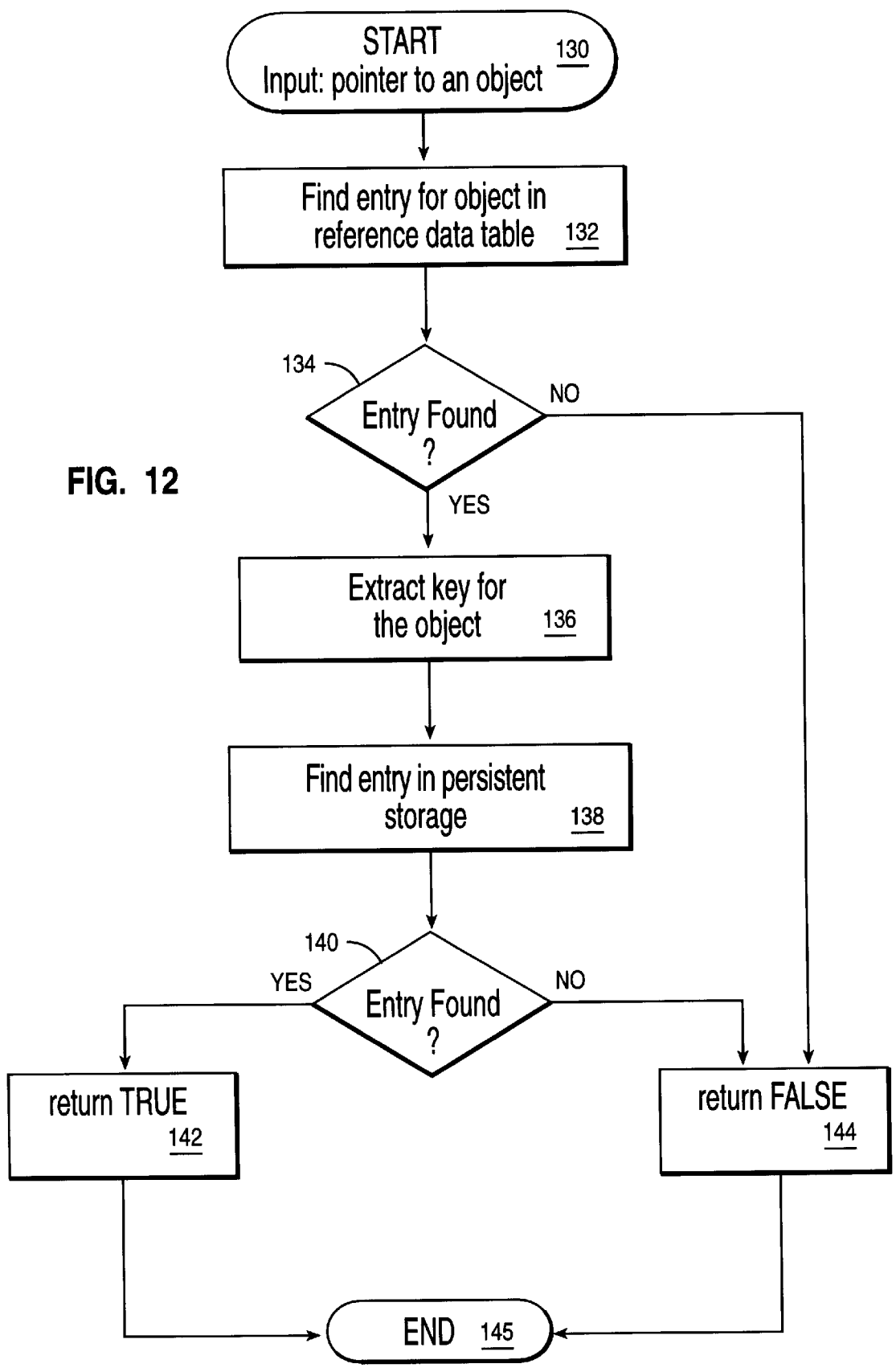
FIG. 12 is a flow diagram for checking if an object is persistent using the invention.

Turning now to FIG. 12, the is_persistent( ) method in the Server for determining whether the input object is persistent is shown. The procedure starts at block 130, with the pointer to an object as input. At block 132, the procedure searches for an entry for the object in the reference data table using the pointer. A check is conducted at block 134, to determine if an entry has been found. If NO, at block 144, the procedure returns FALSE. If YES, at block 136, the key for the object is extracted from its entry in the reference data table. At block 138, the procedure searches for an entry in persistent storage using the key. A check is carried out at block 140, to determine if an entry is found. If YES, at block 142, it returns TRUE. Else, at block 144, it returns FALSE.

As mentioned above, the BaseServer interface defines methods, for importing and exporting object references which must be overridden in the Server to construct proper object references for persistent objects. An object is exported by a server process when the object is handled outside of the server process. For example, when a new object is created in the server and is returned to the client as a return value of a method call, or as an OUT argument of a method, it is necessary to create its object reference.

Figure 13:
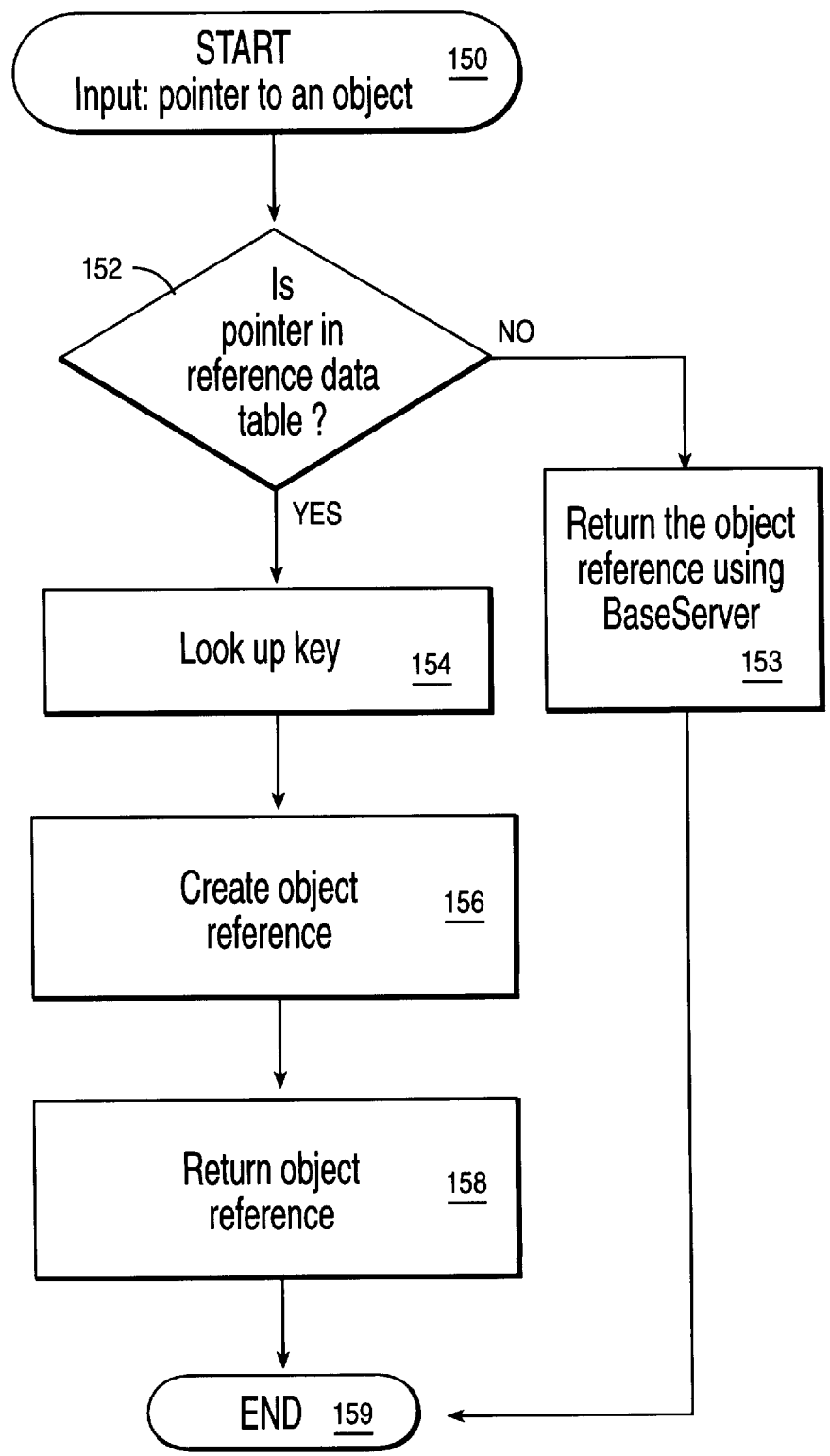
FIG. 13 is a flow diagram for exporting objects using the invention.

Turning now to FIG. 13, there is shown a procedure for exporting objects using the invention. This procedure is called when an object is passed outside of the server process as an argument to the invocation of a method on a remote object, or a return value, or OUT parameter of a method invocation on an object in the server process. The procedure begins at block 150, with the pointer to an object as its input, and proceeds immediately to block 152, which determines if the pointer exists in the reference data table. If YES, at block 154, the server looks up the key and creates an object reference containing the key as shown in block 156. If NO, at block 153, the method of the parent BaseServer class is used to generate the reference. At block 158, the server returns the object reference and the procedure ends at block 159.

Figure 14:
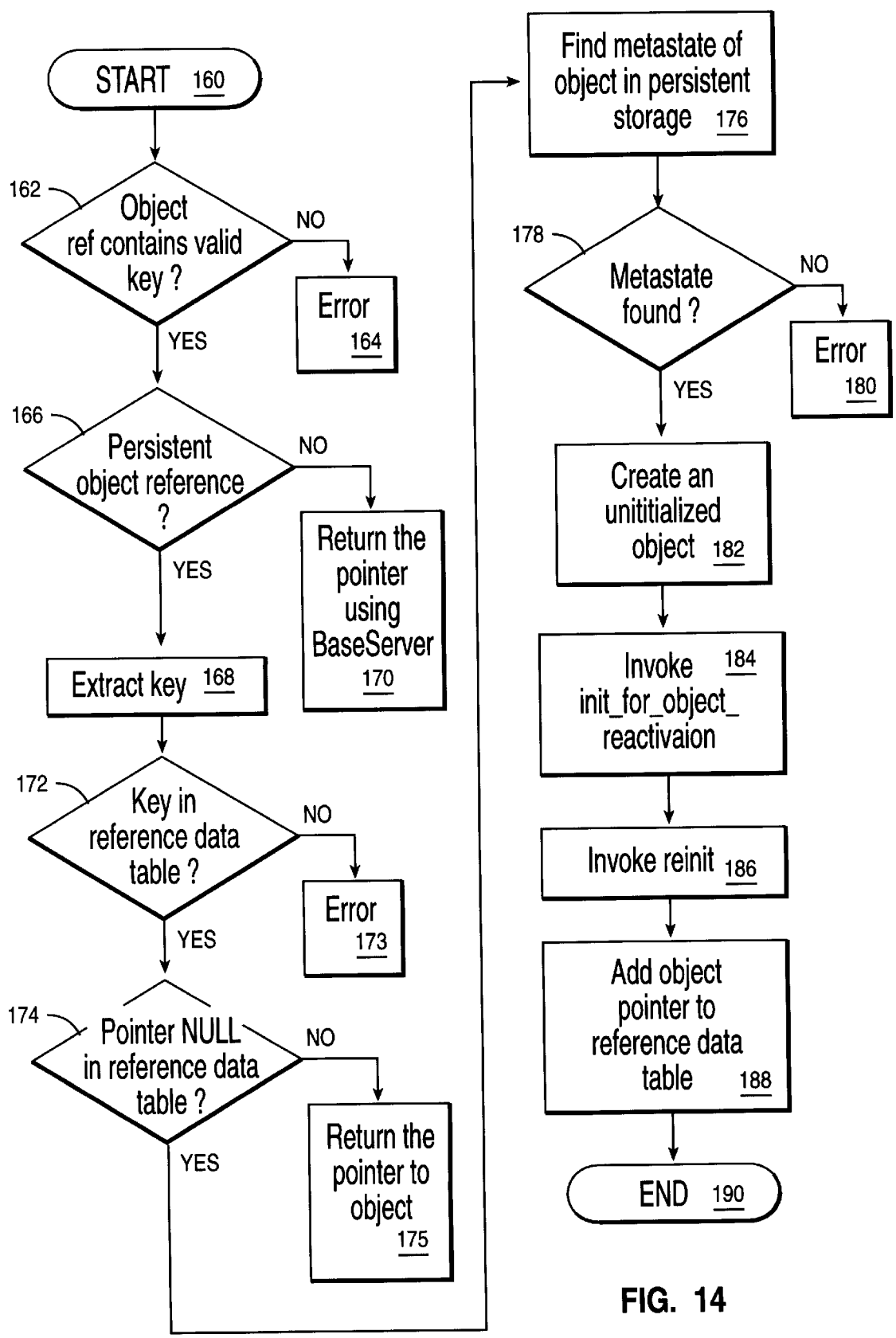
FIG. 14 is a flow diagram for importing objects using the invention.

Turning now to FIG. 14, a procedure is shown for importing objects to a server. The procedure is invoked for object that has been received as an "IN" or "INOUT" argument to a method request from a remote object. The procedure begins at block 160, and proceeds immediately to block 162, which determines if the object reference contains a valid key which indicates that it is a valid object reference. If NO, an error flag is raised at block 164. If YES, at block 166, the procedure determines if the object reference is a persistent object reference by examining the structure of the key. If NO, at block 170, the procedure calls the method of importing objects that is defined in the parent class BaseServer. If the object reference is a persistent object, at block 168, the procedure extracts the key portion from the object reference. At block 172, the procedure determines if the key exists in the reference data table. If NO, an error flag is raised at block 173. If YES at block 172, at block 174, if a pointer associated with the key in the reference data table is not null, the pointer is returned in block 175. If the pointer is null at block 174, the procedure proceeds to block 176, and searches for the record containing the metastate of the object in persistent storage using the key. At block 178, a check is conducted to determine if the metastate was found. If NO, at block 180, the procedures generates an error indication. Else, at block 182, the uninitialized object is created. At block 184, the procedure invokes init-for-object-reactivation on the newly created object. The procedure proceeds to block 186, where it invokes reinit on the object and passes the metastate. At block 188, the procedure adds the object pointer to the reference data table and ends at block 190.

In addition to supporting the methods concerning creating, deleting, and querying the persistence of an object, the server needs to support mechanisms for storing and restoring metastates. The architecture of the metastate allows any parent class to create its own metastate and add it to the entire metastate of the object, as well as to find the metastate that belongs to the class. In order to allow collaborative processing on the metastate structure, the architecture allows each of the parent classes to identify their own state and operate on that without affecting the state belonging to any other parent class of an object. Such a collaboration can be achieved, for example, if the server passes the entire metastate back and forth. The server does not operate on the metastate itself other than to write it out to the persistent storage or read it into memory as needed. Many architectures are possible for the metastate. It can be represented as a sequence of structures or as a list of structures. By defining the metastate as list of structures or by providing a special registration interface, the metastate can be dynamically configured. This makes it possible to design a server that does not need to be configured based on the a priori knowledge of the parent classes of persistent objects. Table C shows an illustrative representation of the metastate as a sequence of structures when the upper bound on the number of parents is small and known a priori. It is assumed that parent and ancestor classes of a persistent object have a fixed number which is known to the class.

TABLE C

```
enum {
    Naming;
    Events;
    LifeCycle;
    Persistence;
    SSecurity;
    ObjectIdentity;
    Transactions;
    Concurrency;
    Externalization;
    Attribute Persistence;
}   service_id_e;
struct metastate_struct {
    service_id_e service_id
    unsigned short version_major;
    unsigned short version_minor;
    any service_metastate;
}   metastate_struct_t;
typedef sequence<metastate_struct_t> metastate_t;
```

The example Server class defined in this invention provides three methods of exchanging metastate with it:
(1) store_individual_metastate( ) which allows an individual parent class to store its metastate,
(2) store_entire_metastate( ) which stores the metastate of all parent classes of an object, and
(3) restore_metastate( ) which reinitializes the object based on the previously stored metastate in the persistent storage.

Figure 15:
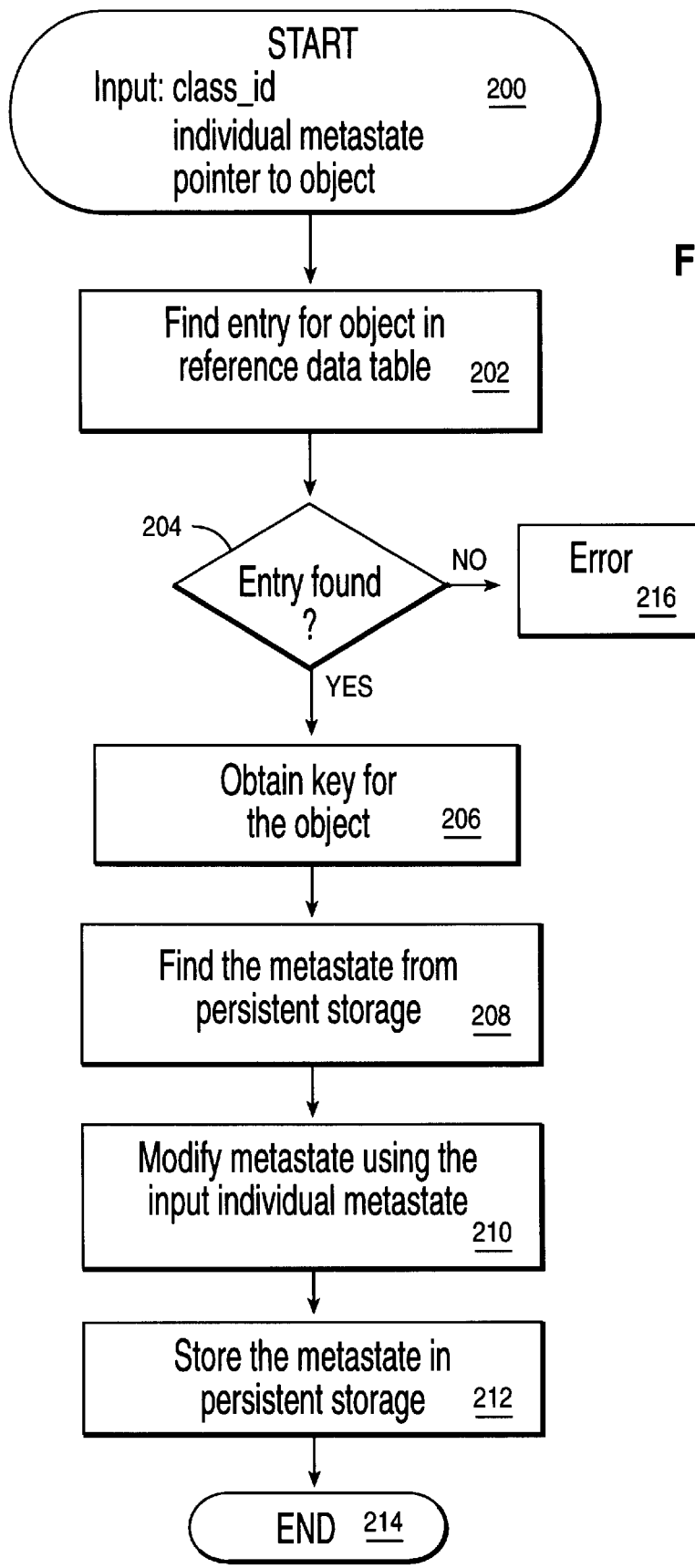
FIG. 15 is a flow diagram for storing individual metastates using the invention.

Turning now to FIG. 15, a procedure is shown for storing individual metastates using the invention. The procedure starts at block 200, with an input representing a class-id, individual metastate, and a pointer to an object. At block 202, the procedure searches for an entry for the object in the reference data table using the pointer. A check is carried out at block 204, to determine if an entry is found. If NO, at block 216, and error indication is generated. If YES, the procedure proceeds to block 206, to get the key of the object from the reference data table. At block 208, the procedure searches for the metastate from the persistent storage using the key, and modifies the metastate using the input individual metastate as shown in block 210. At block 212, the metastate is stored in persistent storage and the procedure ends at block 214.

Figure 16:
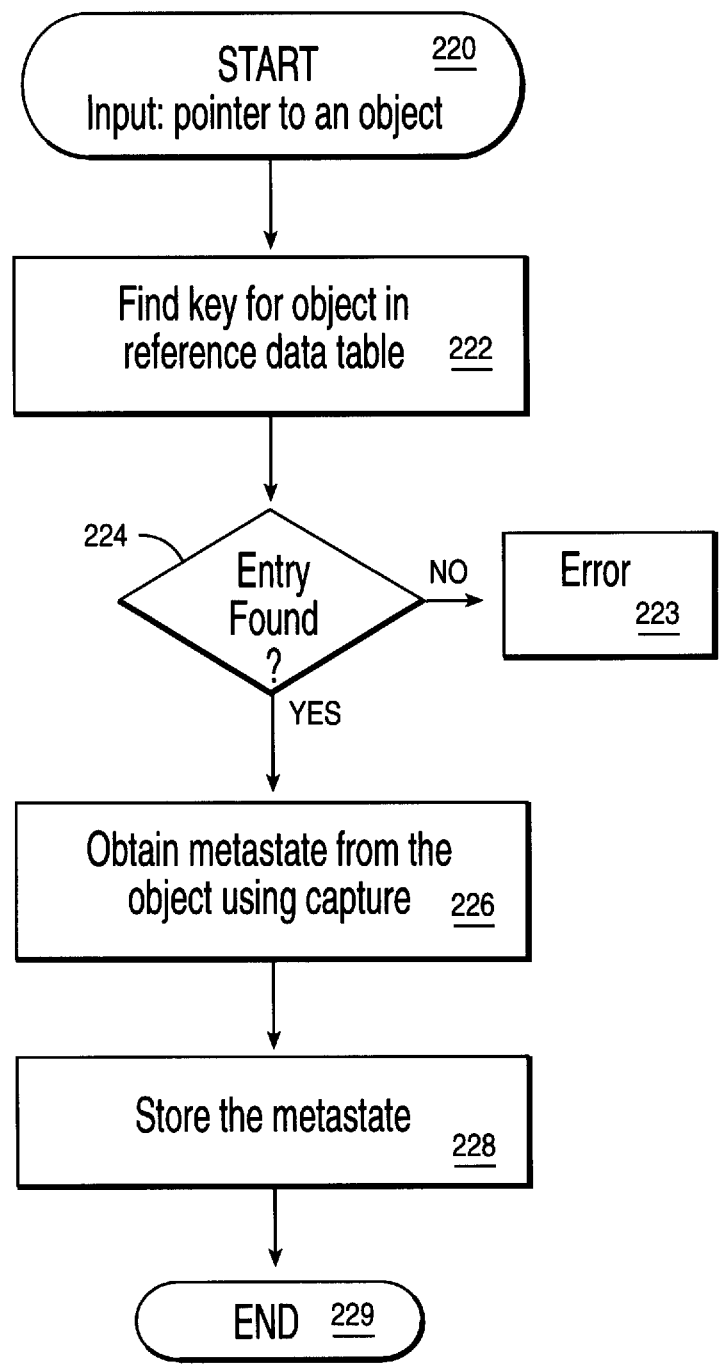
FIG. 16 is a flow diagram for storing the entire metastate of persistent objects using the invention.

Referring now to FIG. 16, a procedure is shown for storing the entire metastate of an object. The procedure starts at block 220, with an input consisting of the pointer to the object. At block 222, a search for the key for the object is conducted in the reference data table. A check is performed at block 224, to determine if the key is found. If NO, at block 223, the procedure generates an error indication. Else, at block 226, the entire metastate for the object is obtained by calling capture( ) on the object. At block 228, the metastate is stored and the procedure ends at block 229. As explained below, the capture( ) method is available on every persistent object to obtain the entire metastate of the object.

Figure 17:
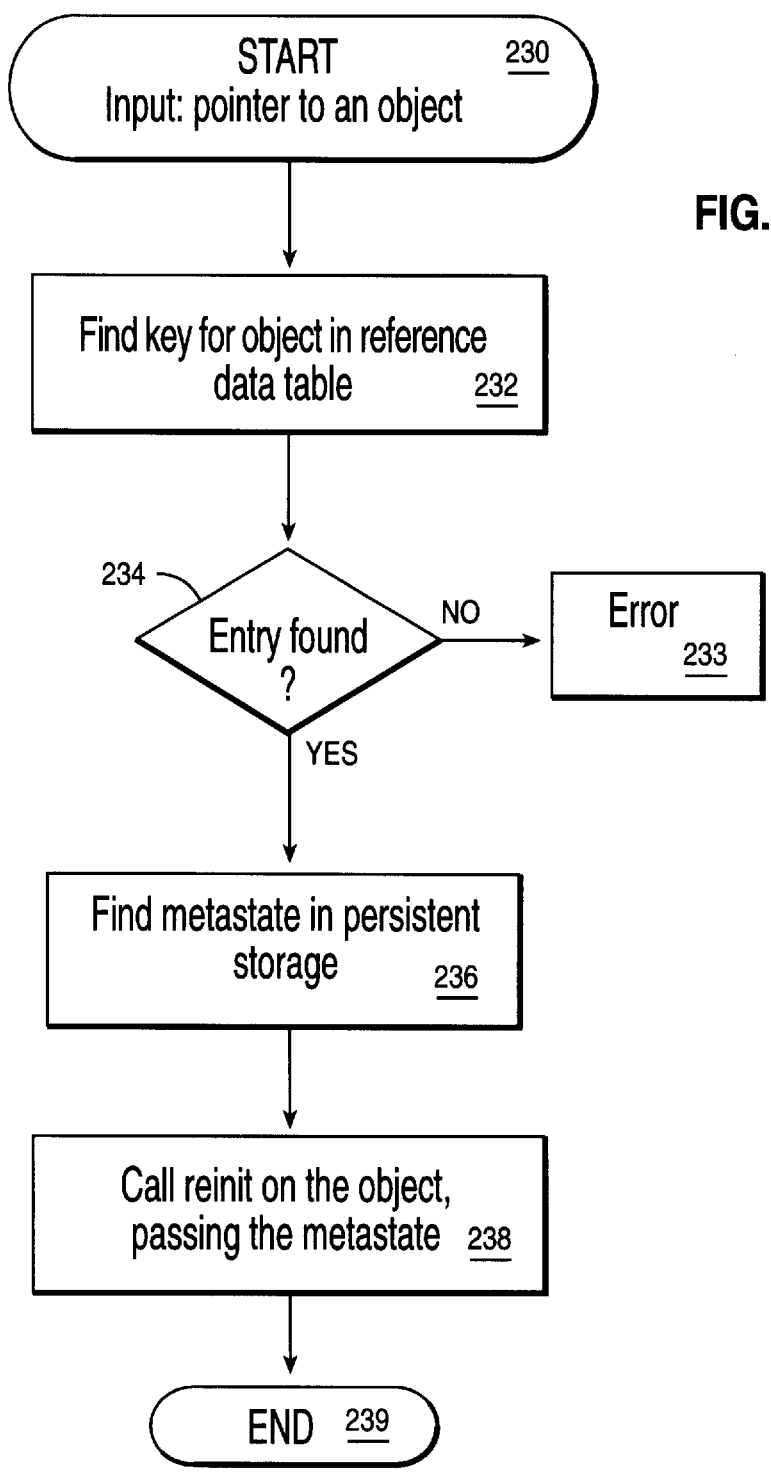
FIG. 17 is a flow diagram for restoring the metastates of persistent objects using the invention.

Referring to FIG. 17, a procedure is shown for restoring the metastate for an object. The procedure starts at block 230, using the pointer to the object as an input. At block 232, a search is carried out to find the key for the object in the reference data table using the pointer. A check is conducted at block 234, to determine if the key is found. If NO, at block 233, and error indication is generated. Else, at block 236, the procedure finds the metastate from persistent storage using the key. The procedure calls reinit( ) on the object at block 238, passes the metastate, and ends at block 239. As explained below, the reinit( ) method is available on every persistent object to reinitialize the object using the metastate.

The last category of methods for the example Server class are concerned with the fact that an in-memory object and an entry in the persistent store are associated with a persistent object. In certain circumstances, it is necessary to remove the in-memory object, for example, when the reference-data-table gets too large, or when the server is temporarily shutdown. Two methods passivate_object( ) and passivate_all_objects( ) are supported by the server.

Figure 18:
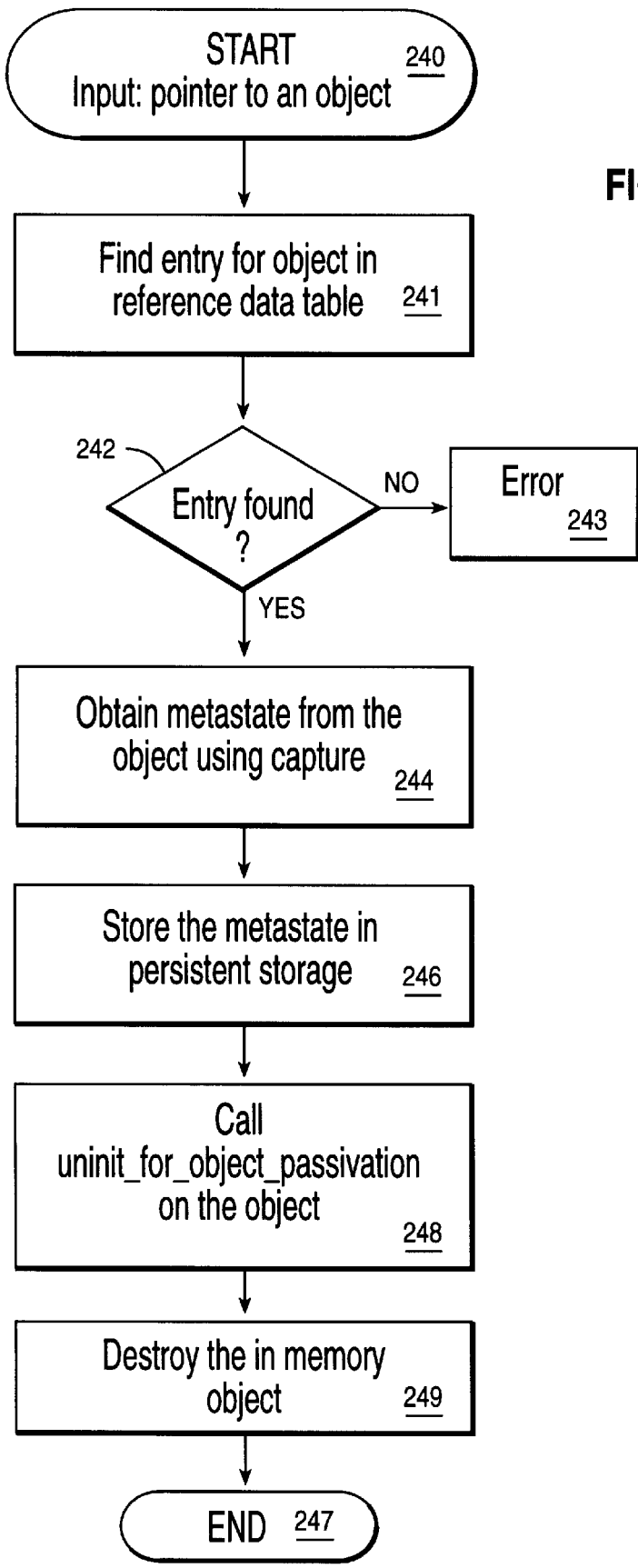
FIG. 18 is a flow diagram for passivating an object using the invention.

Referring now to FIG. 18, a procedure is shown for passivating an object. The procedure starts at block 240, using the pointer to the object as input. At block 241, the procedure searches for the key for the object in the reference data table using the pointer. A check is conducted at block 242, to determine if the key has been found. If NO, the procedure generates an error indication at block 243. If YES, at block 244, the procedure calls the capture( ) method on the object to get its metastate. At block 246, the procedure stores the metastate in the persistent storage, and gives an opportunity to the object to perform suitable un-initialization by calling uninit_for_object_passivation( ) on it at block 248. At block 249, the procedure destroys the in-memory object. Note that the passivate_object( ) method only destroys the in-memory object. The object can be reactivated in the future based on the metastate stored in the persistent storage. The passivate_all_objects( ) simply loops through all the objects registered with the server and passivates each one of them.

Now, we turn to the obligations of persistent objects that make it possible for them to collaborate with the server object. This invention provides a new base class, referred to as ServiceBase, for all persistent objects. The ServiceBase class contains two categories of methods to facilitate exchange of metastate with a persistent object and to properly initialize and un-initialize it during the object lifecycles. The interface definition language (IDL) for the sample ServiceBase interface defined in the invention is shown in TABLE D.

TABLE D

```
interface ServiceBase : Object  {
    enum  {
        Naming;
        Events;
        LifeCycle;
        Persistence;
        Security;
        ObjectIdentity;
        Transactions;
        Concurrency;
        Externalization;
        AttributePersistence;
    }  service_id_e;
    strut metastate_struct  {
        service_id_e service_id;
        unsigned short version_major;
        unsigned short version_minor;
        any service_metastate;
    }  metastate_struct_t;
    typedef sequence<metastate_struct_t> metastate_t;
    void reinit (in metastate_t metastate);
    void capture (inout metastate_t metastate);
    Object init_for_object_creation ();
    Object init_for_object_reactivation ();
    void uninit_for_object_passivation ()
    void uninit_for_object_destruction ();
};
```

One form of collaboration required by a persistent object is that the server must be able to obtain metastate from it and supply metastate to it for reinitialization. One way to achieve this is to define a base class which has reinit( ) and capture( ) methods. The parent classes of a persistent object must inherit from the base class and override reinit( ) to perform its special re-initialization using the metastate passed in as an argument. Similarly, it must supply metastate in the INOUT argument of the capture( ) method. Recall that the server may invoke reinit( ) when an object reference is imported and invoke capture( ) when an object is passivated. In both of these methods, it is preferred that the server pass the entire metastate as an argument. However, other schemes are conceivable. For example, the server object can make use of proprietary methods for each individual class to obtain/supply the metastate. This requires the server object to examine the type of the object, and from that, deduce which method to use.

Another form of collaboration required by persistent objects is that it must be possible to initialize and un-initialize an object in different ways during its lifecycle. Objects that have persistent states, at least on two-level store systems where the first level is RAM (14 in FIG. 2) and second level is persistent store (20 in FIG. 2), have two distinct lifecycles: the lifecycle of the object's persistent state, and the lifecycle of the in-memory object through which its state can be manipulated.

Objects will undergo different types of initialization and un-initialization depending on the condition under which the object is being created or destroyed. One skilled in the art will appreciate that when the object is created for the first time, the object may have to allocate memory for itself to contain instance variables that are too complicated to declare statically. It may be necessary to register the object with various frameworks to which it is subject, including registering it with the server process involved. Integration with the frameworks or applications are referred to as "functional initialization". This kind of initialization is done in init_for_object_creation( ) method of the ServiceBase class.

On the other hand an object that has already been registered in the appropriate frameworks only needs to perform operational initialization (e.g., allocating any memory that it requires to contain its state and the like). This kind of initialization is done in init_for_object_reactivation( ) method of the ServiceBase class. Whenever it reactivates an object, the server invokes a generic class initialization without any object state initialization. The server process then invokes "init_for_object_reactivation" to give the object a chance to allocate the memory it needs. The server process invokes "reinit" on the object to restore the object's metastate.

Likewise, a similar conclusion can be made about un-initialization during object destruction. In some cases, just the in-memory object is being destroyed, so that the object can be moved to a new location. In other cases, the in-memory object is being destroyed simply to passivate it (e.g., its persistent state remains valid). Finally, the object may be destroyed entirely because it no longer belongs in the system. Whenever the server passivates an object, the server first invokes "capture" to obtain the object's metastate. It then invokes "uninit_for_object_passivation" followed by the generic object destruction method. When a client wants to entirely destroy the object, it first invokes "uninit_for_object_destruction" followed by the generic object destruction method.

Each of the class whose instance are persistent objects provide their own specialization(s) of ServiceBase for any classes they offer as mix-ins that introduce metastate, or any framework that introduces metastates. Such a specialization must override "reinit" and "capture" to exchange their own purposes. It must be noted that each method of the ServiceBase class is what is commonly known as an "initializer" or "destructor" method. This means that when an object multiply inherits from two or more classes, the implementation of these methods in a class performs housekeeping that is necessary at its own level and also makes calls to corresponding methods in each of its parent class. It is understood by those skilled in the art that a class must call its parents initializers before doing its own initialization and must call its parents un-initializers (destructors) after doing its own un-initialization.

Figure 19:
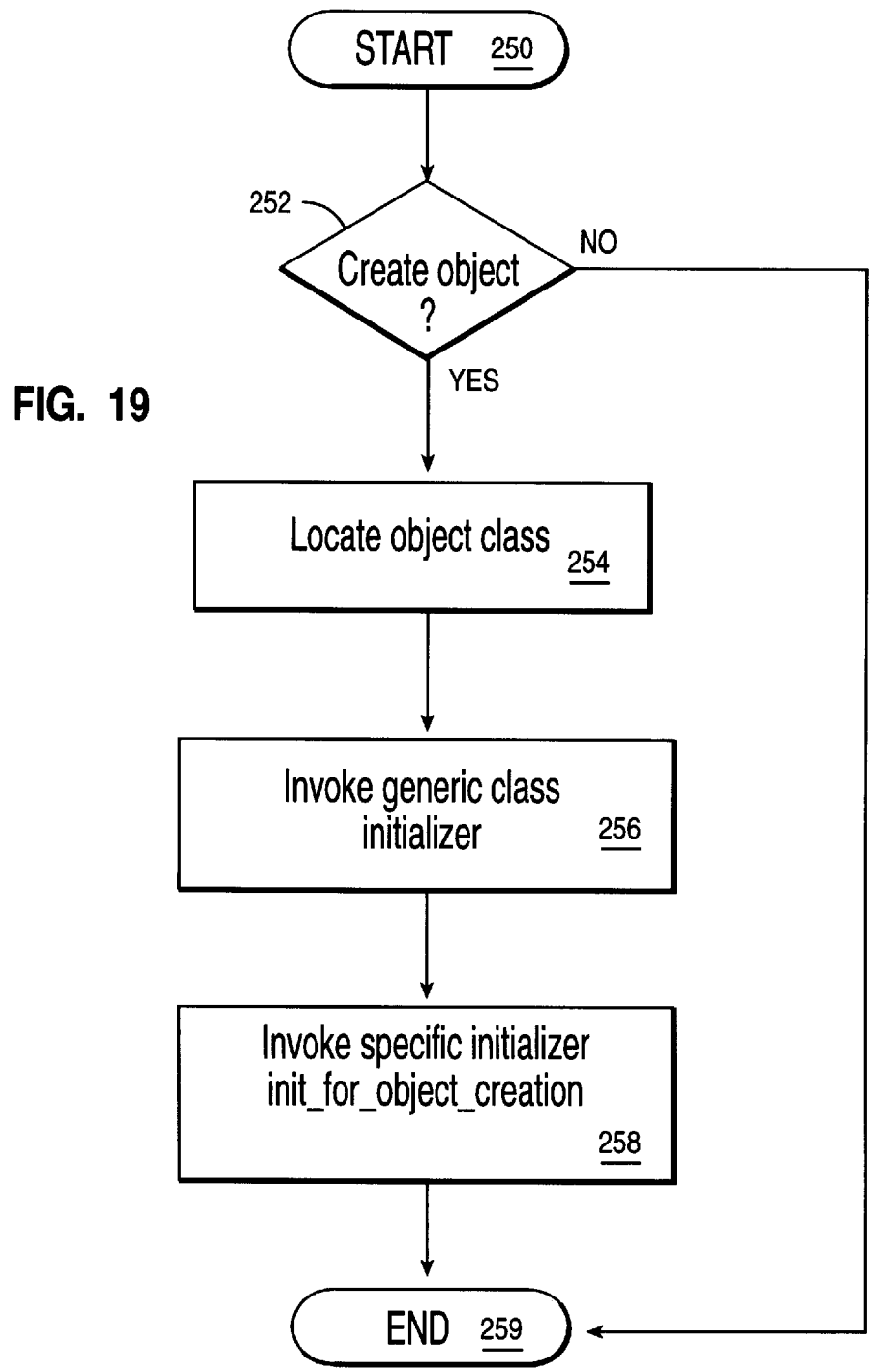
FIG. 19 is a flow diagram for creating a persistent object using the invention.

Next we explain two scenarios which show how various initialization and un-initialization methods can be used. Referring now to FIG. 19 for the first scenario, a flow diagram is shown for creating an object. One skilled in the art will appreciate that object creation is normally performed by a local or remote object factory. Local object factories create new objects using the procedure in FIG. 19. The procedure starts at block 250, and move immediately to block 252, where it is determined that a new object is to be created. If YES, at block 254, the local object factory locates the object's class and invokes the generic initializer on the class as shown in block 256. If NO, at block 254, the procedure ends at block 259. At block 258, the procedure invokes a specific initializer, namely "init_for_object_creation". In general, any initializer involved in initial object creation that introduce persistent objects should invoke "make_persistent_ref" on the server to register the object with a persistent reference.

Figure 20:
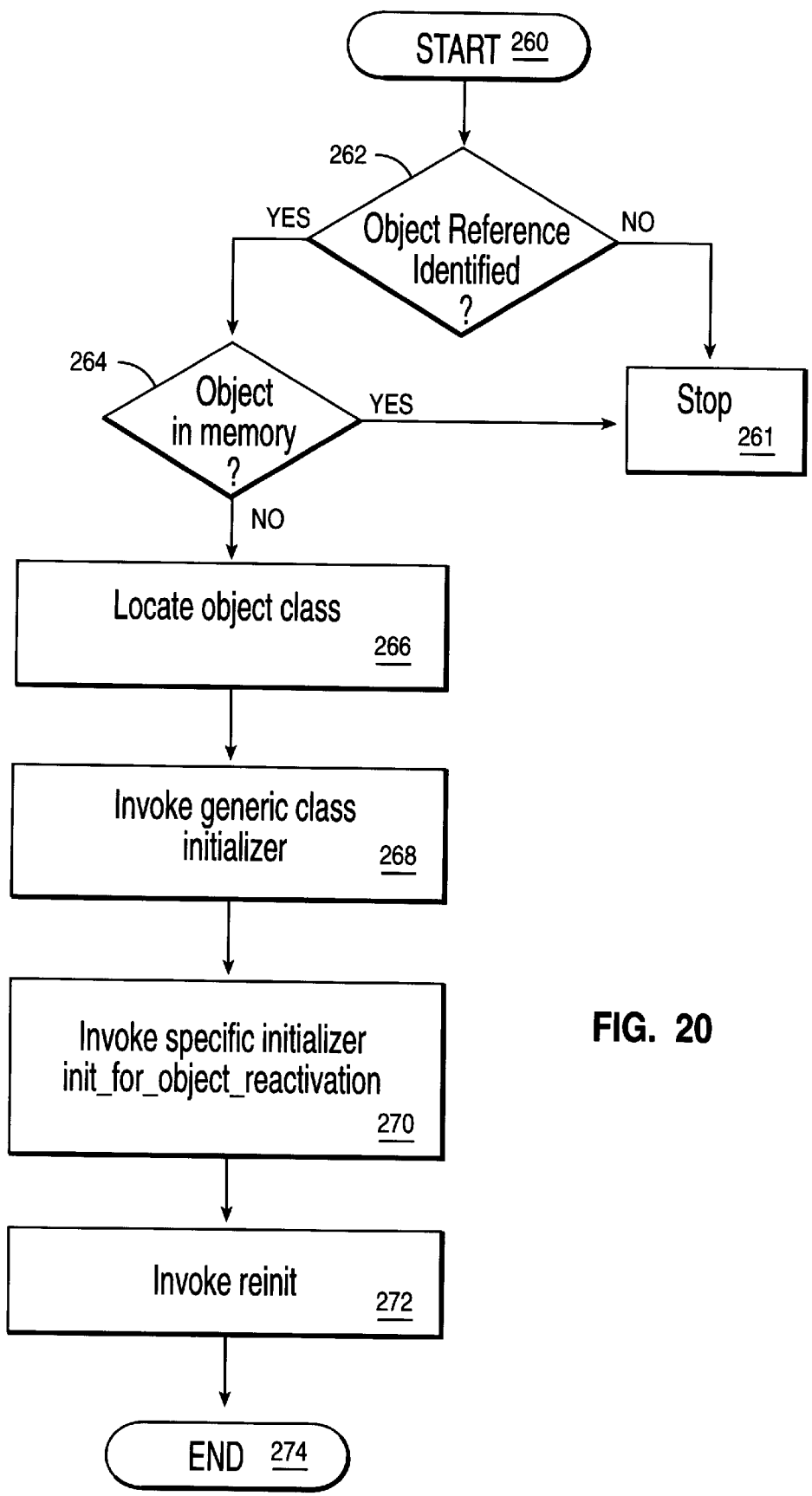
FIG. 20 is a flow diagram for activating an object using the present invention

Turning now to FIG. 20 for a second scenario, a flow diagram is shown for activating an object. The server automatically reactivates any objects with persistent references. If a method is invoked from another process, the object adapter will request the server to resolve the object reference to a local object pointer. With particular reference to FIG. 20, the procedure starts at block 260, and proceeds immediately to block 262, where the server identifies the object reference and determines if the object is present in memory as shown in block 264. If the object is not in memory, the server locates the class-object for the referenced object as shown in block 266. If the object is in memory, the procedure stops at block 261. At block 268, the server invokes the generic class initializer on the class to create a new in-memory instance. The server then invokes "init_for_object_reactivation" on the object to permit object initialization as shown in block 270. At block 272, the server invokes "reinit" on the newly created object to load the metastate for the object. It will be appreciated by those skilled in the art that any subclass of ServiceBase that manages object persistence may override "reinit" to also restore the object's persistent state at this time.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method, implemented in a computer system, for accessing a persistent object in an object-oriented persistent storage mechanism in a distributed data processing system, wherein said persistent object has inherited from a plurality of different object classes where each class has a unique persistence mechanism, comprising the steps of:

providing a persistent object reference in said distributed data processing system having a key for locating said persistent object; and associating said key with metastate data for a plurality of different persistence mechanisms for said persistent object and storing said key and metastate data in said distributed data processing system.

2. The method of claim 1, wherein the step of associating further includes the step of:

creating a tuple for said persistent object by a server in said distributed data processing system, said tuple containing said key and a pointer to a location for said persistent object.

3. The method of claim 1, wherein the step of providing further comprises the steps of:

registering said object as a persistent object with one of a plurality of server processes, and creating said key for the object reference of said persistent object by said one of said server processes.

4. The method of claim 1, wherein only said key is transmitted in response to a request to locate said persistent object in said data processing system.

5. The method of claim 1, wherein only said key is transmitted to a single server to locate said persistent object in said data processing system.

6. The method of claim 1, wherein said key is fixed size and does not change when said persistent object inherits from a plurality of different object classes where each of said plurality of object classes has a unique persistent mechanism.

7. The method of claim 3, wherein the step of registering said persistent object further comprises the steps of:

creating an in-memory object of said persistent object; and manufacturing said key for said persistent object and storing said key as a new entry in a reference data table in said one of said server processes.

8. A method, implemented in a computer, for exchanging metastate data in a distributed data processing system, comprising:

providing a base class for a plurality of persistent objects, said base class having a plurality of methods for exchanging said metastate data; and providing a server class in said distributed data processing system for exchanging metastate data with said persistence objects and for manufacturing an object reference for a selected one of said persistent objects.

9. The method of claim 8, wherein said object reference contains a key associated with said metastate data.

10. An apparatus for accessing a persistent object in an object-oriented persistent storage mechanism in a distributed data processing system, wherein said persistent object has inherited from a plurality of different object classes where each class has a unique persistence mechanism, comprising:

means for providing a persistent object reference in said distributed data processing system having a key for locating said persistent object; and means for associating said key with metastate data for a plurality of different persistence mechanisms for said persistent object and storing said key and metastate data in said distributed data processing system.

11. The apparatus of claim 10, wherein the means for associating further includes:

means for creating a tuple for said persistent object by a server in said distributed data processing system, said tuple containing said key and a pointer to a location for said persistent object.

12. The apparatus of claim 10, wherein the means for providing further comprises:

means for registering said object as a persistent object with one of a plurality of server processes, and means for creating said key for the object reference of said persistent object by said one of said server processes.

13. The apparatus of claim 10, wherein only said key is transmitted in response to a request to locate said persistent object in said data processing system.

14. The method of claim 10, wherein said key is fixed size and does not change when said persistent object inherits from a plurality of different object classes where each of said plurality of object classes has a unique persistent mechanism.

15. A computer program product having a computer readable medium having computer program logic recorded thereon for accessing a persistent object in an object-oriented persistent storage mechanism in a distributed data processing system, wherein said persistent object has inherited from a plurality of different object classes where each class has a unique persistence mechanism, comprising:

computer readable means for providing a persistent object reference in said distributed data processing system having a key for locating said persistent object; and computer readable means for associating said key with metastate data for a plurality of different persistence mechanisms for said persistent object and storing said key and metastate data in said distributed data processing system.

16. The computer program of claim 15, comprising:

computer readable means for creating a tuple for said persistent object by a server in said distributed data processing system, said tuple containing said key and a pointer to a location for said persistent object.

17. The computer program of claim 15, comprising:

computer readable means for registering said object as a persistent object with one of a plurality of server processes, and computer readable means for creating said key for the object reference of said persistent object by said one of said server processes.

18. The computer program of claim 15, wherein only said key is transmitted in response to a request to locate said persistent object in said data processing system.

* * * * *